(12) United States Patent
McAllister et al.

(10) Patent No.: US 6,450,438 B1
(45) Date of Patent: Sep. 17, 2002

(54) APPARATUS AND METHODS FOR FORMING A TAPE PACK

(75) Inventors: Jeffrey S McAllister, Boise, ID (US); Philip John Turner, Broomfield, CO (US); James C. Anderson, Eagle, ID (US); Carl R. Hoerger, Boise, ID (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/843,209

(22) Filed: Apr. 25, 2001

(51) Int. Cl.[7] .............................................. B65H 23/00
(52) U.S. Cl. ................... 242/548.3; 242/547; 242/614; 242/346.2
(58) Field of Search ............................ 242/548.3, 547, 242/614, 395, 346.2, 358, 358.1

(56) References Cited

U.S. PATENT DOCUMENTS

| | | | | |
|---|---|---|---|---|
| 1,878,381 A | * | 9/1932 | Continsouza et al. ....... | 242/358 |
| 2,226,961 A | * | 12/1940 | Arnold ...................... | 242/548.3 |
| 2,877,957 A | * | 3/1959 | Hyman ...................... | 242/547 |
| 3,106,361 A | * | 10/1963 | Boyer ....................... | 242/614 |
| 3,342,435 A | * | 9/1967 | Gelardi et al. ............. | 242/614 |
| 3,977,626 A | * | 8/1976 | Gaiser et al. .............. | 242/345 |
| 4,454,998 A | * | 6/1984 | Sarser ...................... | 242/614 |
| 4,778,119 A | * | 10/1988 | Yamazaki et al. .......... | 242/547 |
| 5,226,613 A | * | 7/1993 | Kataoka et al. ............ | 242/345 |
| 5,533,690 A | * | 7/1996 | Kline et al. ................ | 242/547 |
| 6,045,086 A | * | 4/2000 | Jeans ....................... | 242/548.3 |

FOREIGN PATENT DOCUMENTS

JP          63-144820    *  6/1988   ............. 242/548.3

* cited by examiner

*Primary Examiner*—John M. Jillions

(57) ABSTRACT

The invention includes apparatus and methods for forming a tape pack on a drum or the like in aligned formation. An apparatus in accordance with the present invention can include at least one alignment member. The tape pack, as it is formed, can be periodically passed by the alignment member to facilitate substantially aligned formation thereof. A method in accordance with the present invention includes rotating a tape pack, winding a length of tape around the tape pack, and periodically passing the tape pack past a localized, stationary contact point where outermost windings of the tape pack are urged into aligned formation.

7 Claims, 12 Drawing Sheets

APPARATUS AND METHODS FOR FORMING A TAPE PACK

FIELD OF THE INVENTION

This invention pertains to tape take-up devices and more specifically, to apparatus and methods for forming a tape pack in a substantially aligned formation as a length of tape is wound onto the tape pack.

BACKGROUND OF THE INVENTION

Various forms of tape are employed for the storage of data. When we say "tape" we mean an elongated strip of substantially flexible material. One form of tape is that of magnetic tape. Other types of tape are known, such as punch tape in which a pattern of perforations is made to correspond to specific data characters. Although various forms of tape are known, some portions of the discussion herein will be primarily presented with regard to magnetic tape for illustrative purposes.

However, it is understood that the instant invention is equally applicable to any type of tape that can be wound onto a drum or the like, and it is further understood that the primary use of magnetic tape for illustrative purposes herein is not intended to limit the instant invention to any particular type of tape, including magnetic tape. Furthermore, when we use the word "tape" herein without the use of any specific corresponding modifying words, we mean to include within the meaning of the word "tape" any type of tape which can be wound onto a reel, drum, or the like.

Prior art magnetic data storage tape often comprises extremely thin plastic tape along with a substance that is supported on the tape and which can be magnetized. The tape is linearly passed by a writing tape head that is configured to impart, or write, a magnetic pattern on the tape. The magnetic pattern imparted on the tape by the tape head corresponds to various data characters which can be employed to store data on the tape. The data can be recorded in either a digital format or an analog format.

The magnetic tape can be passed by a reading tape head that is configured to detect and measure the magnetic pattern on the tape in order to "read" the data that is magnetically stored on the tape. In some instances, the writing head and the reading head can be integrally incorporated into one single tape head which is referred to as a read/write head. Often, tape is wound onto a prior art tape take-up device such as a reel, a spool, or the like, to hold the tape in a secure manner during storage and handling of the tape.

Referring to FIG. 1, a perspective view is shown of a typical prior art tape take-up device 10 which is in the form of a reel. The prior art take-up device 10 comprises a substantially cylindrical drum 12. The drum 12 is positioned between, and connected to, a first flange 14 and a second flange 16. The take-up device 10 is configured to be rotated about an axis of rotation 20. A length of tape (not shown) can be wound around the drum 12 between the first and second flanges 14, 16 as the take-up device 10 is rotated. A slot 18, or the like, can be formed on the drum 12 to provide an anchoring point for one end of the tape.

Now referring to FIG. 2, a top view is shown of a typical prior art tape read/write device 50. As is seen, a first take-up device 10A and a second take-up device 10B, which can be configured as reels, are rotatably supported on a base "B" of the device 50. The read/write device 50 includes a tape head "H" which can be either a write only head, a read only head, or a combination read/write head. The device 50 can also include various tape guides "G" and a tape drive device "D" which is configured to pull a length of tape "T" past the tape head "H." As is evident, the first and second take-up devices 10A and 10B can be employed in conjunction with one another to each hold at least a portion of a length of tape "T" when data is being written onto, or read from, the length of tape.

During operation of the prior art read/write device 50, the first reel 10A which initially holds an entire length of tape "T" can be placed onto the base "B" so as to be rotatable about a first axis of rotation 20A. The tape "T" is held on the first reel 10A in a coil winding, which is sometimes referred to as a "tape pack." A free end (not shown) of the tape "T" can be threaded across the guides "G" and the tape head "H" as well as the tape drive device "D." The tape "T" can then be attached or connected to the second reel 10B in preparation for take-up of the tape onto the second reel.

The first and second reels 10A, 10B can then rotate in the directions indicated by the arrows 52A, 52B, respectively, as the tape "T" moves across the tape head "H" in the direction indicated by the arrow 54. The tape head "H" can read from, or write onto, the tape "T" as the tape passes, or moves across, the tape head. As the tape "T" moves in the direction 54, the tape unwinds from the first reel 10A and winds onto the second reel 10B. The tape "T" can be wound back onto the first reel 10A by reversing the directions of rotation 52A, 52B of the first and second reels 10A, 10B which will cause the tape to move across the tape head "H" in a direction which is opposite the direction 54.

Alternatively, the tape "T" can be rewound back onto the first reel 10A from the second reel 10B without being moved across the tape head "H." This can be accomplished by extending the tape "T" directly from the first reel 10A to the second reel 10B, wherein the tape bypasses the tape head "H," guides "G," and drive device "D." This alternative procedure for rewinding the tape "T" onto the first reel 10A from the second reel 10A can be used when no reading or writing by the tape head "H" is to be performed during the rewinding of the tape "T" back onto the first reel 10A. In one variation of the prior art tape read/write device, the tape head "H" can be retracted while the tape is rewound in order to reduce abrasion wear of the tape head as a result of the tape moving across the tape head at a relatively high speed.

Moving to FIG. 3, a top view is shown of the prior art take-up device 10 which is depicted in FIG. 1. As is seen in FIG. 3, the cylindrical drum 12 is located between and attached to a first flange 14 and a second flange 16 which is located in substantially juxtaposed relation to the first flange. The take-up device 10 is configured to rotate about the axis of rotation 20. The second flange 16 is shown broken away to reveal a winding of tape "T," known as a tape pack, which is shown supported about the drum 12. An anomaly 30 which is in the form of a bump is also revealed in the winding of tape "T." As is evident, three sectional views, 3A—3A, 3B—B, and 3C—3C, are taken through the prior art take up device 10, each of which will be discussed below.

Now referring to FIG. 3A, a first sectional view 3A—3A through the tape take-up device 10 is shown. The axis of rotation 20 of the take-up device 10 is shown for reference. As is also seen, a portion of the drum 12 is shown between the first and second flanges 14, 16 respectively. One purpose of the first and second flanges 14, 16 is to assist in forming a coil of tape "T" as the tape is wound around the drum 12. That is, the first and second flanges 14, 16 are supposed to keep the tape "T" in a substantially straight and orderly coil as the tape is wrapped or wound around the drum 12.

To accomplish the aforementioned purpose of assisting in forming the tape "T" into an orderly coil on the drum 12, spacing is maintained between the first and second flanges 14, 16. The first and second flanges 14, 16 are generally configured so as to be substantially parallel to one another and to be spaced slightly wider than the width of the tape "T." Ideally, this configuration allows the tape "T" to pass freely between the first and second flanges 14, 16 while also being guided thereby so as to form a substantially orderly coil about the drum 12.

However, as illustrated in FIG. 3A, the spacing between the first and second flanges 14, 16 can sometimes be too narrow for the tape "T" to pass freely there between. In some cases, the spacing between the first and second flanges 14, 16 can be too narrow for the free passage of the tape "T" there between. This can be caused by any of a number of reasons, including manufacturing defects, warping, and damage due to impact or excessive force.

In such cases wherein the flange spacing is too narrow, the tape "T" can bind on either or both of the first and second flanges 14, 16 as it is coiled about the drum 12. The binding action of the tape "T" on the flanges 14, 16, as the tape is coiled about the drum 12 can cause an anomaly 30 (shown in FIG. 3), such as a bump in the coil of tape. Such an anomaly 30 can result in damage to the tape "T" as well as problems associated with writing and reading data to and from the tape, respectively.

Moving to FIGS. 3B and 3C, a second sectional view 3B—3B and a third sectional view 3C—3C are shown, respectively, of the tape take-up device 10 which is depicted in FIG. 3. As is seen with reference to FIG. 3, each of the first and second sectional views 3B—3B and 3C—3C are taken through the take-up device 10 in the locations indicated. With reference to FIG. 3B, it is seen that, at the location of the second sectional view 3B—3B, the first and second flanges 14, 16 are substantially parallel to one another. However, although parallel, the first and second flanges 14, 16 are both deformed, or skewed, in a first direction which is indicated by the arrow 31. Such deformation of the first and second flanges 14, 16 can have any of a number of causes including manufacturing defects and exposure to excessive force or excessive heat.

With reference now to FIG. 3C, it is seen that, at the location of the third sectional view 3C—3C, the first and second flanges 14, 16 are substantially parallel to one another. However, both flanges 14,16 are deformed, or skewed, in a second direction which is indicated by the arrow 32. By referring to both FIGS. 3B and 3C, it is evident that the first and second flanges 14, 16 are skewed in substantially opposite directions 31, 32 at each of the locations of the second and third sectional views 3B—3B, 3C—3C, respectively. The skewed nature of the flanges 14, 16 can cause the flanges to have a wobbling effect as the take-up device 10 rotates about the axis of rotation 20. This wobbling effect is sometimes referred to as "runout."

It is also evident from FIGS. 3B and 3C that, because the flanges 14, 16 are skewed, the tape "T" will wobble, or oscillate, from side-to-side along with the flanges 14, 16 as the take-up device 10 rotates about the axis of rotation 20. That is, as the take-up device 10 rotates about the axis 20 the tape "T" will wobble back and forth between the first direction 31 and the second direction 32 as the tape winds onto, or off of, the take-up device. Such wobbling of the tape "T" from side to side as the tape is wound onto, or wound off of, the take-up device 10 can have a deleterious effect on either the tape itself or the read/write process.

For example, such wobbling of the tape "T" can cause the edges of the tape to be forced alternately against opposite sides of the tape guides "G" (shown in FIG. 2). Such wobbling can be especially problematic in situations wherein the take-up device 10 rotates at a high speed such as hundreds or thousands of revolutions per minute. This can result in excessive wear of the edges of the tape "T" and excessive wear of the tape guides "G." The wobbling condition of the tape "T" can also cause excessive and rapid lateral movement of the tape relative to the tape head "H" (shown in FIG. 2). Such movement of the tape "T" relative to the tape head "H" can cause malfunctions or disturbances in the read/write process.

In addition to the problems discussed above, deleterious effects can result from tape "wander" which can occur even when the tape reel 10 is accurately manufactured. That is, since the flanges 14, 16 are ideally spaced slightly farther apart than the width of the tape "T," the tape can thus wander back and forth between the flanges due to natural inherent variances in typical prior art mechanical tape-handling equipment. When wander occurs, an edge of the tape "T" can come into contact with one of the flanges 14, 16. This can cause the tape "T" to bounce off of the flange 14, 16, but typically not before the edge of the tape has been slightly deformed from the contact. This deformation of the tape "T" can not only cause problems in the read/write process, but can also cause the formation of bulges and the like, resulting in skewed tape windings similar to that depicted in FIGS. 3 and 3A.

As is evident from the above discussion, problems are associated with the use of prior art tape take-up devices, including those specifically described above for FIGS. 1 through 3C. What is needed then, is a method and apparatus for winding tape onto a drum or the like which achieve the benefits to be derived from similar prior art devices, but which avoid the shortcomings and detriments individually associated therewith.

SUMMARY OF THE INVENTION

The invention includes methods and apparatus for forming a tape pack in a substantially aligned manner by rotating the tape pack so that the tape pack periodically passes a stationary location. At least one dynamic alignment member can be positioned at the stationary location. As the tape pack periodically passes the alignment member, at least the outermost windings of the tape pack are urged into aligned formation by the alignment member.

In accordance with a first embodiment of the present invention, an apparatus for forming a tape pack from a length of tape comprises an alignment member which defines a gap through which the tape pack can be passed to facilitate substantially aligned formation thereof upon a drum or the like.

In accordance with a second embodiment of the present invention, an apparatus for forming a tape pack can comprise a pair of alignment members which are each substantially in the form of rollers configured to rotate about axes which are substantially parallel to one another and substantially perpendicular to the axis of rotation of the drum. A gap is defined between the alignment members through which the tape pack can be passed to facilitate substantially aligned formation thereof.

In accordance with a third and a fourth embodiment of the present invention, respective apparatus include a pair of alignment members which are in the form of substantially conical rollers that are rotatable about substantially parallel axes of rotation, or a pair of alignment members which are in the form of substantially cylindrical rollers that are rotatable about substantially perpendicular axes. In accordance with each of the embodiments, a tape pack can be passed between the respective pair of rollers to facilitate substantially aligned formation of the tape pack.

In accordance with a fifth embodiment of the present invention, an apparatus for forming a tape pack can comprise a pair of spaced substantially conical rollers that define a gap there between, and through which gap the tape pack can be passed to facilitate substantially aligned formation thereof.

In accordance with a sixth embodiment of the present invention, an apparatus for forming a tape pack can comprise a pair of substantially dished discs that are configured to rotate with a drum upon which the tape pack is formed and are also configured to rotate about respective axes which are inclined relative to the drum axis. The inclined alignment axes cause the alignment members to tilt toward the tape pack to define a gap there between through which the tape pack can be passed to facilitate substantially aligned formation thereof.

In accordance with a seventh embodiment of the present invention, an apparatus for forming a tape pack can include a pair of alignment members which are each comprised of a plurality of substantially radial alignment extensions that can be resiliently deflected toward the tape pack by movement of the respective alignment members against a stationary guide. The deflected portion of each respective alignment member acts to define a gap there between through which the tape pack can be passed to facilitate substantially aligned formation thereof.

In accordance with an eighth embodiment of the present invention, an apparatus for forming a tape pack can include a pair of alignment members which are each mounted on a drum on either side of the tape pack formed thereon. Each of the alignment members is substantially in the form of a resiliently deformable conical ring that can be resiliently deflected toward the tape pack by movement of each respective alignment member against a stationary guide. The deflection of each of the alignment members defines a gap through which the tape pack can be passed to facilitate substantially aligned formation thereof.

In accordance with a ninth embodiment of the present invention, a method of forming a tape pack is disclosed. The method includes rotating a drum, winding a length of tape about the drum, and passing the tape between a pair of alignment members to facilitate substantially aligned formation of the tape pack.

DETAILED DESCRIPTION OF THE INVENTION

The present invention includes apparatus and methods for forming a tape pack on a drum or the like in a substantially aligned manner. The present invention includes apparatus for causing the tape to be urged in a preferred direction such that the edges of the tape are caused to be substantially aligned to form a tape pack having substantially aligned edges. The apparatus can include "alignment members" which are dynamic elements and which are configured to locally and periodically contact the edge of the tape as it is being wound onto the drum to thus urge the tape in the preferred direction so as to form the substantially aligned edges of the tape pack.

By employing local, periodic contact of the tape by the alignment members, the undesirable effects of the prior art static flange configuration used for forming a tape pack are avoided. Apparatus in accordance with the present invention can also include guide members for guiding the alignment members as the alignment members form a substantially aligned tape pack on the drum. We will now describe our invention in detail. However, it is understood that the invention should not be limited to the following examples, but is meant to include any method and apparatus falling within the scope of the appended claims.

In general, the apparatus in accordance with the first embodiment of the present invention includes an alignment member which can be configured substantially as a flanged roller which contacts the outer periphery of the tape pack. The alignment member is configured to substantially laterally constrain the outer windings of the tape pack so as to maintain substantially aligned formation of the tape pack. The alignment member is movably supported so as to accommodate the increase in size of the tape pack as tape is wound thereon.

Figure 1:
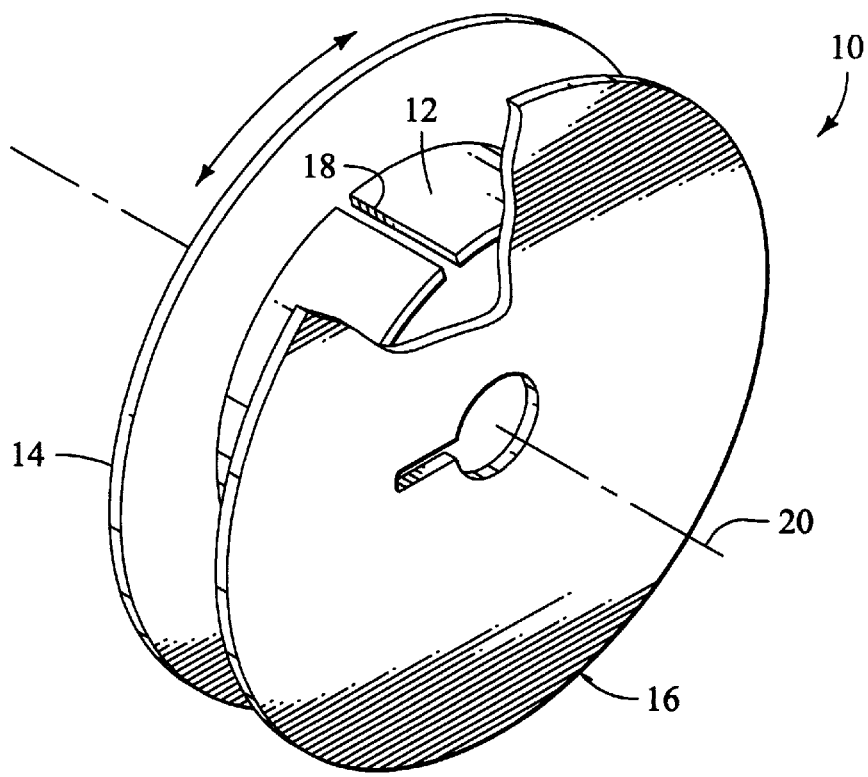
FIG. 1 is a perspective view of a prior art tape pack forming device.
Figure 2:
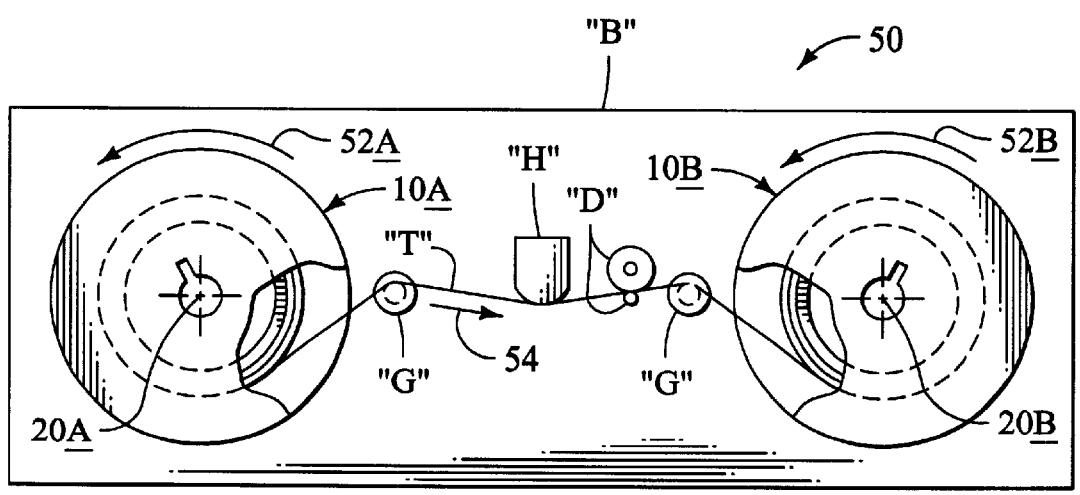
FIG. 2 is a top view of a prior art tape read/write device which employs a prior art tape pack forming device depicted in FIG. 1.
Figure 3:
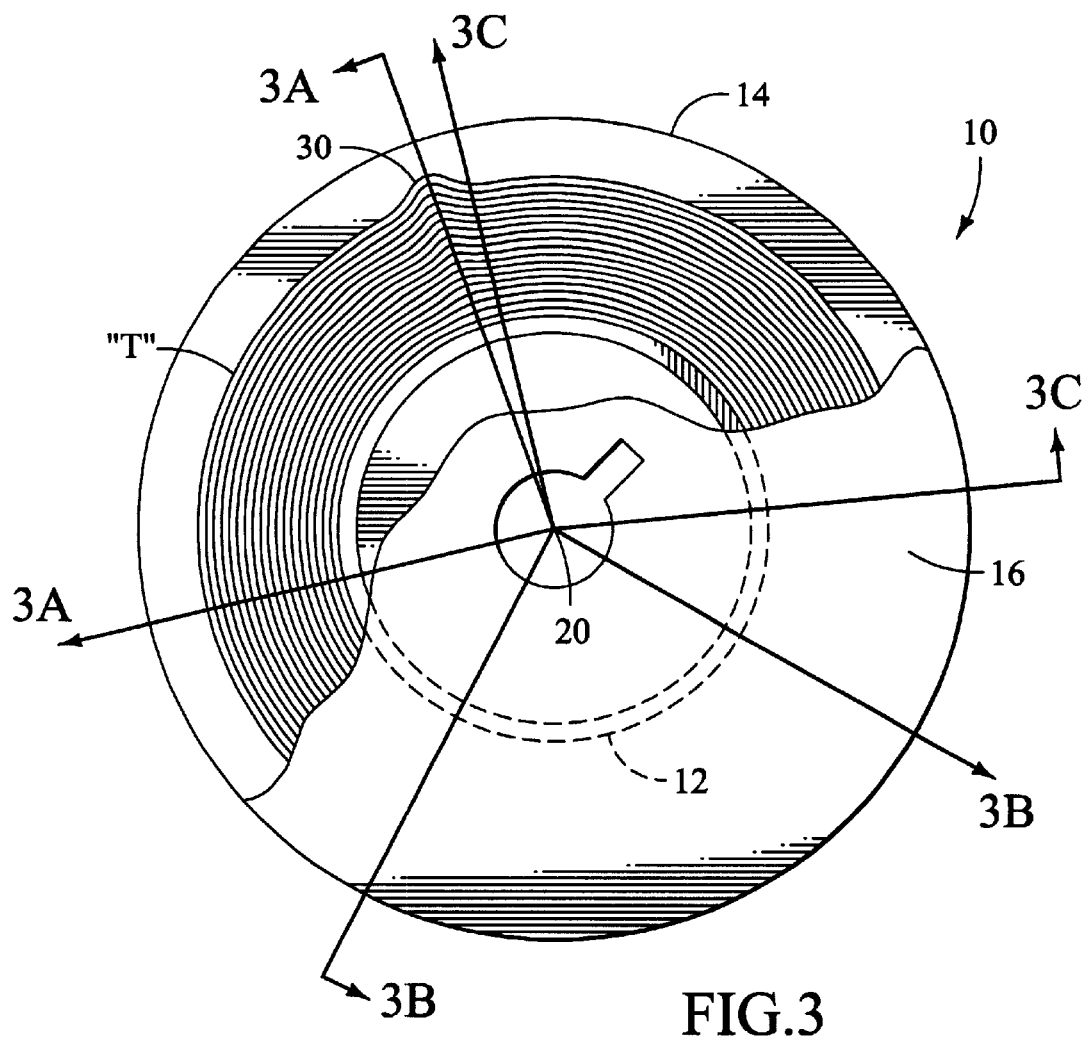
FIG. 3 is side cutaway view of the prior art tape pack forming device depicted in FIG. 1.
Figure 3A:
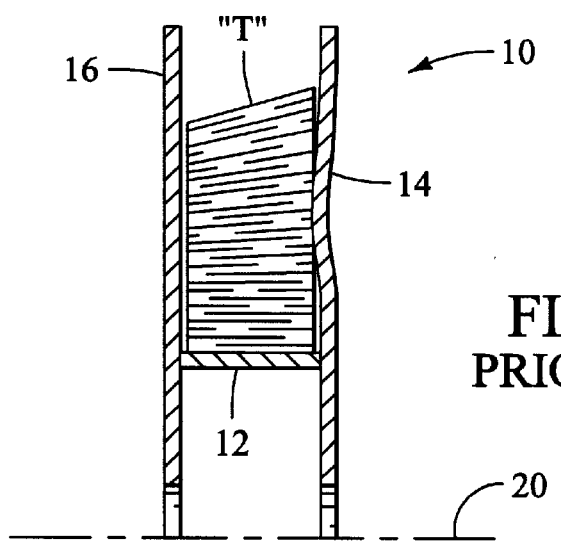
FIG. 3A is a first sectional view 3A—3A which is taken through the prior art tape pack forming device depicted in FIG. 3.
Figure 3B:
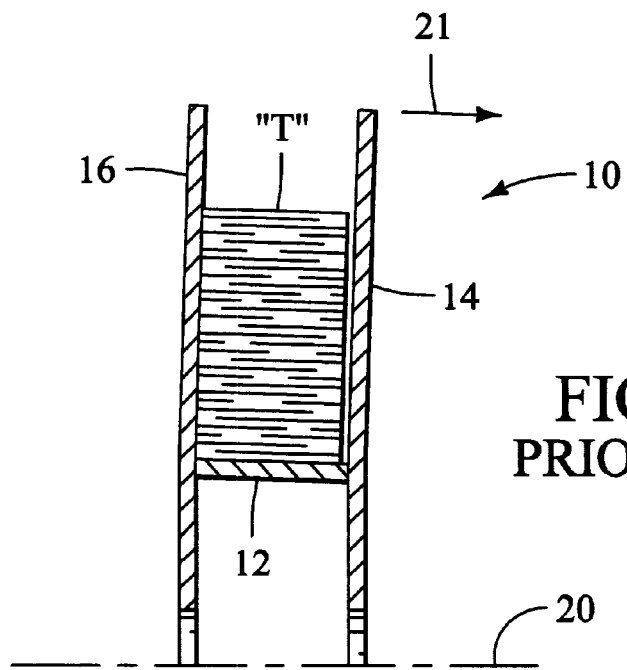
FIG. 3B is a second sectional view 3B—3B which is taken through the prior art tape pack forming device depicted in FIG. 3.
Figure 3C:
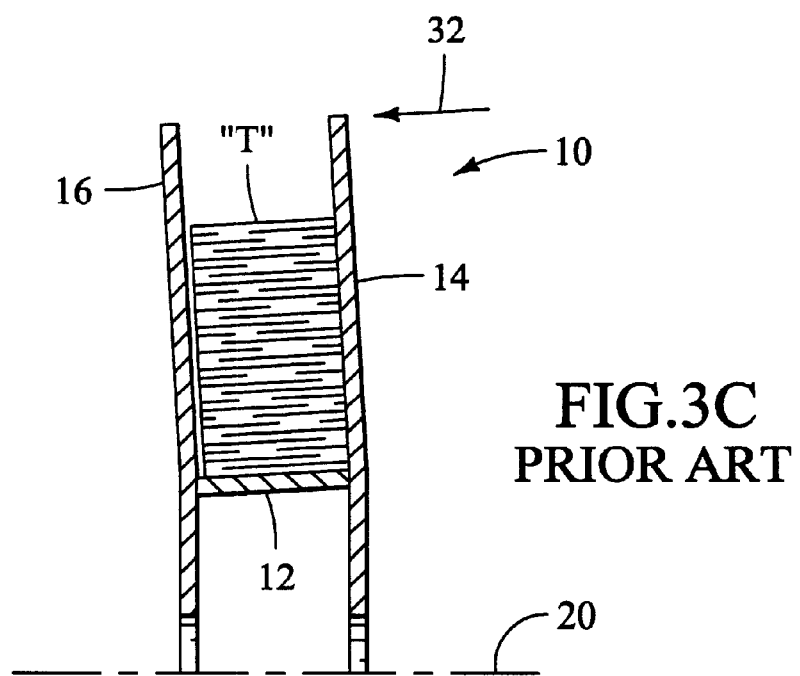
FIG. 3C is a third sectional view 3C—3C which is taken through the prior art tape pack forming device depicted in FIG. 3.
Figure 4:
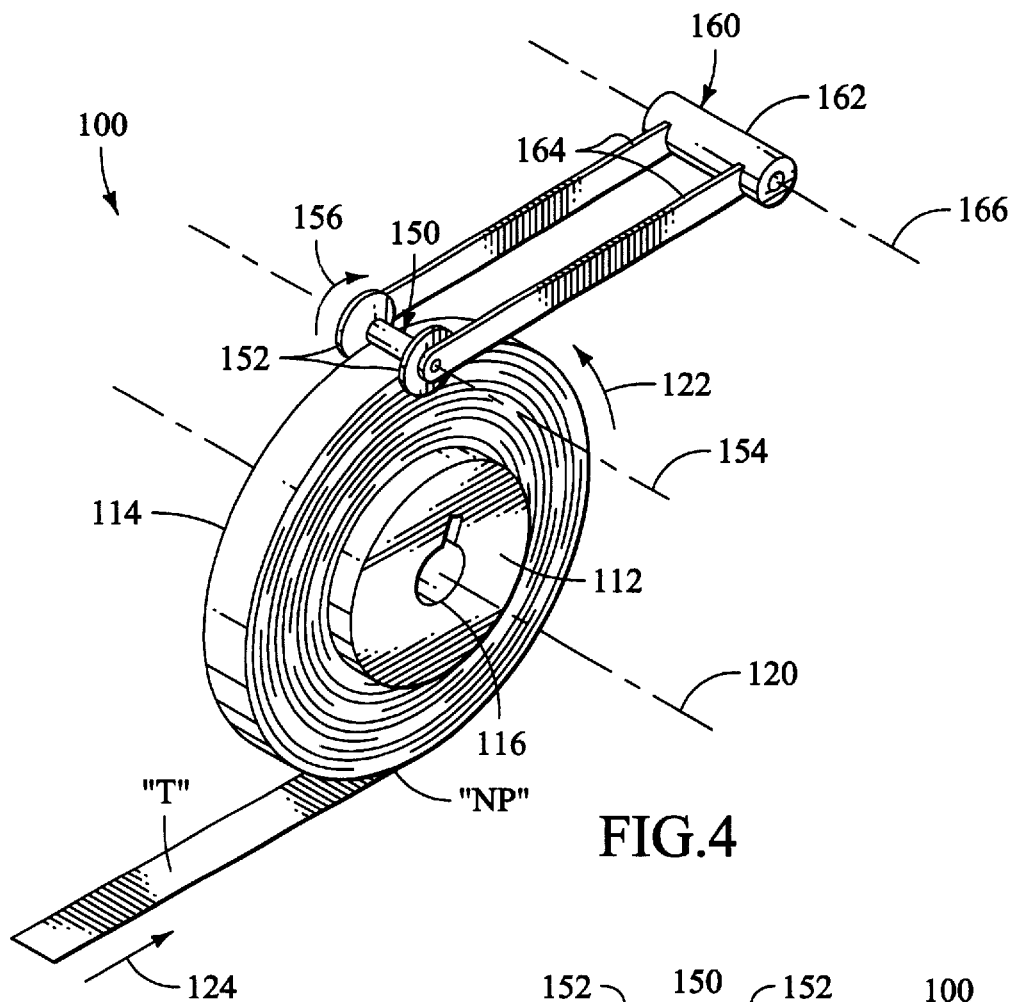
FIG. 4 is a perspective view of a tape pack forming apparatus in accordance with a first embodiment of the present invention.

Turning now to FIG. 4, a perspective view is shown of an apparatus 100 in accordance with a first embodiment of the present invention. As is seen, the apparatus 100 can comprise a drum 112 which is configured to rotate about a drum axis of rotation 120. The drum 112 is configured to receive a length of tape "T," such as magnetic tape, which can then be wound onto the drum to form a tape pack as described below. A center hole 116 is defined in the drum 112. The center hole 116 can be employed to rotatably support the drum 112 by placing the drum on a prior art read/write device such as that described above and shown in FIG. 2. Such a read/write device can comprise a spindle (not shown) or the like on which the drum 112 can be placed so that the spindle protrudes through the center hole 116. The drum 112 can then be rotated on the spindle about the drum axis 120 to cause the tape "T" to be wound onto or off of the drum.

With reference to FIG. 4, the drum 112 is also configured to support a length of tape "T" thereon. The length of tape "T" can be supported on the drum 112 in the form of a "tape pack" 114. When we say "tape pack" we mean a coil, or winding, of tape or the like which is formed around a drum or the like by winding the tape around the drum. It is understood that such a tape pack can be substantially self-supporting under certain circumstances. Generally, if a minimum amount of tension is applied to the tape "T" along its length, and if the diameter of the tape pack is not excessive relative to the width of the tape, a tape pack can be supported on a drum or the like without substantial lateral support. That is, if the tape pack is relatively tightly wound around the drum, and is not excessively high, then side flanges or the like are not necessary to support the tape pack.

Furthermore, it is understood that, at relatively high rotational speeds of the drum 112 and tape pack 114, a thin layer of air can be present between at least the two most outer windings of the tape pack. That is, in cases wherein the tape pack 114 is rotating at relatively high speeds, at least the outer two windings of the tape pack can be separated by a thin layer of air which becomes trapped there between. This layer of air can allow the winding of tape "T" which is supported on it to be laterally moved with relative ease. That is, the layer of air which becomes trapped beneath a given layer of tape "T" during relatively high speed rotation of the tape pack 114 can allow the given layer of tape "T" to "float" so as to be moved from side to side while the tape pack is being formed. The relevance of this will become apparent in the discussion below.

As is evident, the tape pack 114 can be formed about the drum 112 by rotating the drum in a direction of rotation 122 so as to wind the tape "T" onto the drum as shown. During such a rotation of the drum, the tape "T" winds onto the tape pack 114 by moving in an approach direction 124 toward a nip point "NP." When we say "nip point" we mean the location on the periphery of the tape pack where a free length of tape meets the tape pack so as to be wound thereon.

As is seen, the apparatus 100 comprises an alignment member 150. When we say "alignment member" we mean a device that is configured to ensure substantially aligned formation of a tape pack as the tape pack is formed on a drum or the like by employing a surface which is defined on the alignment member to urge the tape into a substantially straight, even, and orderly tape pack formation.

As is seen, the alignment member 150 can be configured to rotate about an alignment axis of rotation 154. The alignment axis 154 is preferably substantially parallel to the drum axis 120. The alignment member 150 can have a flange 152. Preferably, the flange 152 is a substantially radial flange as shown. More preferably the alignment member 150 comprises a pair of substantially radial flanges 152 which are each located opposite the other on respective ends of the alignment member.

The alignment member 150 is preferably supported on a support device 160. When we say "support device" we mean a device that is configured to support an alignment member as defined herein. The support device 160 can comprise a hub 162 which can be configured to pivot about a pivot axis 166. The support device 160 is preferably configured to be supported on a base (not shown) or the like such as a tape read/write device so as to pivot about the pivot axis 166. The support device 160 can have an arm 164 having a first end which is connected to the hub 162 and an opposite second end on which the alignment member 150 is rotatably supported. The support device 160 can alternatively have a pair of arms 164 as shown.

Figure 4A:
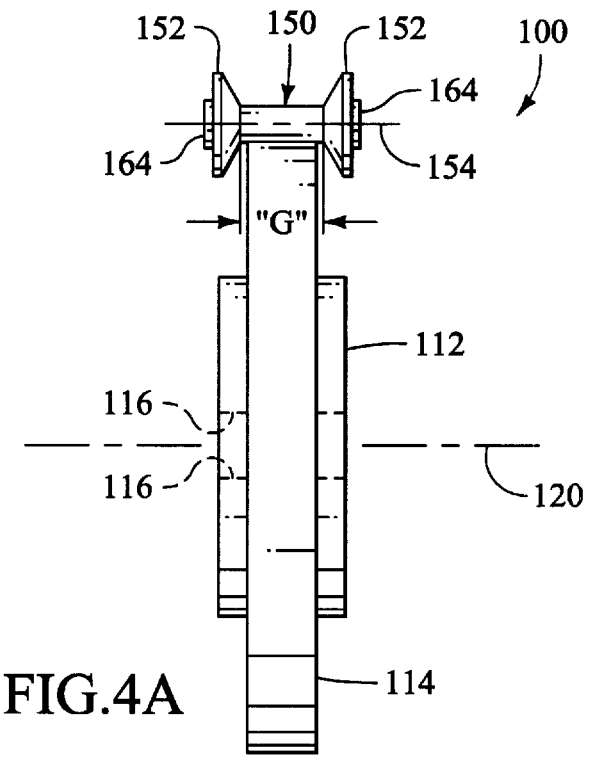
FIG. 4A is a front view of the tape pack forming apparatus which is depicted in FIG. 4.

Moving to FIG. 4A, a front view is shown of the apparatus 100 which is depicted in FIG. 4. As is seen in FIG. 4A, the alignment member 150 can be configured to rest against the tape pack 114. Preferably, the pair of flanges 152 are spaced to define a localized, stationary gap "G" there between. When we say "gap" we mean a space which is defined by one or more alignment members and which is configured to facilitate the substantially aligned formation of a tape pack by substantially laterally constraining at least several outer windings of the tape pack within the space.

When we say "localized" we mean that the gap is configured to constrain a given circumferential location on the tape pack. When we say "stationary" we mean that the gap is substantially immobile relative to the axis of rotation of the tape pack. It is understood that while the gap can be substantially immobile relative to the rotational axis of the tape pack, the alignment member, or members, that define the gap can be dynamic. When we say "dynamic" we mean the alignment member is configured to move relative to the gap.

As is seen, the tape "T" can be periodically passed through the gap "G" as the tape pack 114 rotates about the drum axis 120. When we say "periodically" we mean that a given location on the outer periphery of the tape pack 114 will pass through the gap "G" at a regular interval, or period, as the tape pack rotates. Generally, the given location on the outer periphery of the tape pack 114 will periodically pass through the gap "G" at an interval which is equal to the rotational speed of the tape pack in revolutions per minute. That is, the given location on the tape pack 114 will generally pass through the gap "G" once for every revolution of the tape pack.

Preferably, the spacing between the pair of flanges 152 which define the gap "G" is only slightly greater than the width of the tape "T." Also, preferably, both the alignment member 150 and the drum 112 are rotatably supported about the respective axes 154 and 120 so as to be substantially immobile relative to one another along the respective axes. That is, preferably, in the operating position the alignment member 150 cannot substantially move along the alignment axis 154 relative to the drum 112. Conversely, the drum 112 preferably cannot substantially move along the drum axis 120 relative to the alignment member 150.

The alignment member 150 is preferably fabricated from a material, and in a manner, which causes minimal damage to the tape "T" by way of contact therewith. That is, the alignment member 150 is preferably fabricated from a material which has properties that are substantially suitable for contact with the tape "T." Also, the alignment member 150 is preferably configured such that portions of the alignment member which contact the tape "T" have a minimum of sharp edges and rough surfaces which could damage the tape.

Moving back now to FIG. 4, the tape pack 114 can be formed on the drum 112 by rotating the drum in the direction 122 about the drum axis 120 to wind the tape "T" onto the drum. As the drum 112 is rotated, the length of tape "T" feeds onto the tape pack 114 in the direction 124 and joins the tape pack at the nip point "NP." The alignment member 150 can be brought into contact with the tape pack 114 by pivoting the support device 160 about the pivot axis 166.

The rotational motion of the tape pack 114 in the direction 122 can cause the alignment member 150 to rotate in a direction 156 which is substantially opposite the direction of rotation of the tape pack. Several of the outermost windings of the tape pack 114 are laterally constrained with in the gap "G" defined between the flanges 152 so as to facilitate substantially aligned formation of the tape pack. When we say "aligned formation" we mean that the tape pack 114 is formed with substantially straight sides which are substantially perpendicular to the axis of rotation of the tape pack, wherein the tape pack has substantially no runout or wobble. In this case, the axis of rotation of the tape pack 114 is the drum axis 120.

As the size of the tape pack 114 increases with the addition of tape "T" thereto, the alignment member 150 can move away from the drum 112 by way of the pivoting action of the support device 160 about the pivot axis 166. As is evident, the alignment member 150 can be held against the tape pack 114 by gravitational force. Alternatively, however, the support device 160 can be resiliently biased so as to hold the alignment member 150 against the tape pack 114. This can be accomplished by employing a resilient member (not shown) such as a spring or the like to resiliently bias the support device 160 so as to hold the alignment member 150 against the tape pack 114.

Alternatively, the alignment member 150 can be positioned relative to the tape pack 114 by utilizing a servo actuator (not shown) or the like in conjunction with an automatic positioning and feedback control system (not shown) connected to the support device 160. For example, in conjunction with such a feedback control system, a sensor can be employed to detect the size of the tape pack 114. The sensor can then generate a signal which is sent to a controller (not shown) such as a micro processor. The controller can read the signal and respond thereto by instructing an actuator to position the alignment member accordingly so as to attain a proper orientation or position of the alignment member relative to the tape pack as a function of the tape pack size. Such servo actuators, as well as automatic positioning and feedback control systems, are known in the art and are not discussed further herein.

As shown, the alignment member 150 is preferably located substantially opposite the nip point "NP." That is, the gap "G" alignment member 150 is preferably positioned about 180 degrees of rotation from the nip point "NP" relative to the drum axis 120. It is understood, however, that the alignment member 150 can be located at any of a number of positions relative to the nip point "NP." It is also understood that the support device 160 can be configured to change the position of the alignment member 150, and thus the position of the gap "G," relative to the nip point "NP." That is, the alignment member can be configured to be repositioned about the tape pack 114 in relation to the nip point "NP." Furthermore, although the alignment member 150 is depicted as contacting the tape pack 114, it is understood that the alignment member need not fully contact the tape pack.

As is evident, the alignment member 150 can act to maintain substantial aligned formation of the tape pack 114 by ensuring substantial alignment of each successive winding of tape "T" with the respective previous winding. This alignment action of the alignment member 150 can occur because the outer periphery of the tape pack is substantially contained within the gap "G" defined between the pair of flanges 152 which are spaced apart only slightly more than the width of the tape "T." Also, because the alignment member 150 is oriented as shown in relation to the tape pack 114, wherein the drum axis 120 and the alignment axis 154 are substantially parallel, and because the drum 112 and alignment member are substantially prevented from moving axially relative to one another, each successive winding of the tape "T" is urged into substantial alignment with the previous winding of the tape "T" as the tape pack 114 is formed on the drum 112.

As is evident, such straight, even, and orderly formation of the tape pack 114, as provided by the apparatus 100, can substantially prevent the side-to-side wobble of the tape pack which is often associated with prior art tape take-up devices as described above. Moreover, use of the apparatus 100 can substantially prevent the formation of bumps and other such anomalies in the tape pack 114 which are often associated with prior art tape take-up devices. This is because the apparatus 100 does not require the spaced, side-by-side, parallel flanges which are employed by the prior art tape take-up devices for providing alignment of the tape pack and which are often the cause of such side-to-side wobble as well as bumps and other such anomalies.

Figures 5, 5A:
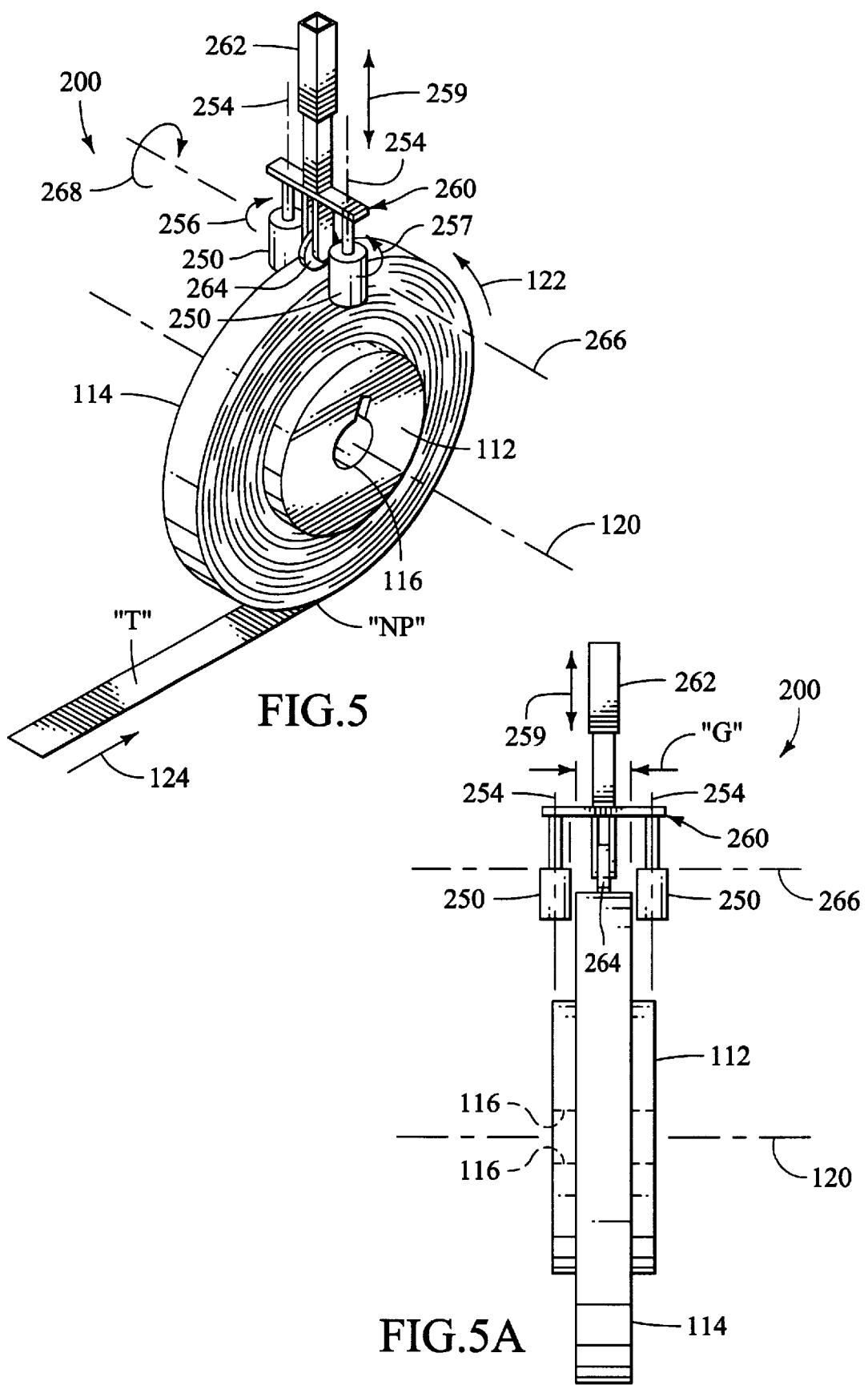
FIG. 5 is a perspective view of a tape pack forming apparatus in accordance with a second embodiment of the present invention.
FIG. 5A is a front view of the tape pack forming apparatus which is depicted in FIG. 5.

Turning now to FIG. 5, a perspective view is shown of an apparatus 200 in accordance with a second embodiment of the present invention. As is seen, the apparatus 200 can comprise the drum 112 which is described above for the apparatus 100. The drum 112 is configured to rotate about the drum axis of rotation 120 in a manner similar to that described above for the apparatus 100. That is, the drum 112 can be rotatably supported on a spindle or the like (not shown) which can pass through the center hole 116 which is defined in the drum.

The apparatus 200 comprises a dynamic alignment member 250 which can be in the form of a cylindrical roller or the like. Preferably, the apparatus 200 comprises a pair of spaced dynamic alignment members 250 which are each in the form of a cylindrical roller and which are each configured to rotate about one each of a pair of substantially parallel alignment axes of rotation 254 as shown. The alignment members 250 can be rotatably supported on a support device 260 which can be mounted on a base or the like (not shown) such as a prior art tape read/write device.

The support device 260 can comprise a telescoping slide 262 or the like which can be configured to allow the alignment members 250 to move along a support path of movement which is indicated by the arrows marked 259. Alternatively, the support device 260 can be configured to pivot as in the manner of the support device 160 which is described above for the apparatus 100 and which is depicted in FIGS. 4 and 4A.

With reference to FIG. 5, the support device 260 can further comprise a following wheel 264 or the like which is rotatably mounted on the support device. The following wheel 264 can be configured to rotate about a following axis 266. The following axis 266 is preferably substantially perpendicular to each of the alignment axes 254. The following wheel 264 can be configured to contact the outer periphery of the tape pack 114.

Preferably, the following wheel 264, as well as each of the alignment members 250, are fabricated from a material, and in a manner, which will not substantially damage the tape "T." That is, preferably the following wheel 264 and the alignment members are fabricated from a material comprising plastic, rubber, or the like, and the portions which can contact the tape pack 114 are preferably designed with a minimum of sharp edges and rough surfaces. In any case, the following wheel 264 and alignment members 250 are preferably constructed from a material, and in a manner, which will minimize damage to the tape "T."

Moving to FIG. 5A, a front view is shown of the apparatus 200 which is depicted in FIG. 5. As is seen, the spacing between each of the pair of alignment members 250 can be slightly greater that the width of the tape "T" so as to define a localized, stationary gap "G" between each of the alignment members. As is evident, the tape "T" can be periodically passed through the gap "G" as the tape pack 114 and drum 112 are rotated about the drum axis 120.

Preferably, each of the alignment axes 254 is substantially perpendicular to the drum axis 120. By "substantially perpendicular" we mean from about 25 degrees to about zero degrees from perpendicular, and preferably closer to zero degrees from perpendicular. Additionally, the support path of movement 259 can also be substantially perpendicular to the drum axis 120. That is, except for rotational movement, the support device 260 is preferably configured to limit the movement of the alignment members 250 to that of substantially radial movement relative to the drum axis 120.

Turning back to FIG. 5, a length of tape "T" can be wound onto the drum 112 to form a tape pack 114 thereon by rotation of the drum in the direction of rotation 122. The length of tape "T" approaches the tape pack 114 in the direction 124 and joins the tape pack at the nip point "NP." Several of the outermost layers, or coils, of tape "T" on the tape pack 114 can pass between the pair of alignment members 250, and thus through the gap "G," as the drum 112 and tape pack rotate in the direction of rotation 122. As the size of the tape pack 114 increases, the action of the following wheel 264 against the outer periphery of the tape pack 114 can cause the alignment members 250 to move substantially along the path of movement 259 and away from the drum 112.

The following wheel 264 can be held against the tape pack 114 by the force of gravity. Alternatively, the following wheel can be held against the tape pack 114 by the force of a resilient member (not shown) such as a spring or the like. In yet another alternative configuration of the apparatus 200 which is not shown, the following wheel 260 can be deleted and replaced by an automatic positioning and feedback control system (not shown) which can be configured to automatically position the alignment members 250 along the alignment path 259 in response to a change in size of the tape pack 114. Such automatic positioning systems are discussed briefly above for the apparatus 100 which is depicted in FIGS. 4 and 4A.

It is evident from a study of FIGS. 5 and 5A that the apparatus 200 can be employed to facilitate aligned formation of the tape pack 114 as the tape "T" is wound onto the drum 112. This is because, as the tape pack 114 rotates with the drum 112, the outermost layers, or coils, of the tape "T" are passed through the gap "G" which is defined between the pair of alignment members 250. The movement of the pair of alignment members 250 is substantially limited to the alignment path 259. That is, the pair of alignment members 250 are substantially fixed along the drum axis 120, as is the drum 112. Thus, as the tape pack 114 increases in size, or grows, as additional layers of tape "T" are added, the growth is limited to a direction which is substantially parallel to that of the alignment path 259.

Moreover, because the spacing between the alignment members 250 can be substantially precisely controlled, and because the tape pack 114 is contacted by the alignment members at a substantially localized contact point, the formation of anomalies in the tape pack, such as bumps and the like, can be prevented. Several variations of the apparatus 200 are possible which function in a similar manner, but which have alignment members which are configured somewhat differently.

Figure 6:
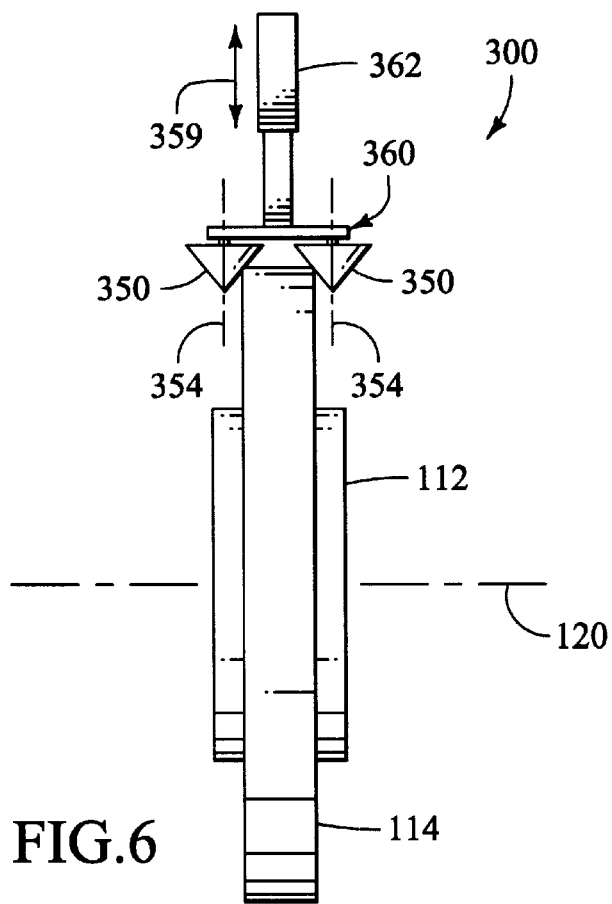
FIG. 6 is a front view of a tape pack forming apparatus in accordance with a third embodiment of the present invention.

For example, referring now to FIG. 6, a front view is shown of an apparatus 300 in accordance with a third embodiment of the present invention. As is seen, the apparatus 300 can be somewhat similar to the apparatus 200. That is, the apparatus 300 can comprise the drum 112 which is configured to rotate about the drum axis of rotation 120. The tape pack 114 can be formed around the drum 112 by rotating the drum about the drum axis 120. The apparatus 300 comprises an alignment member 350 that is substantially in the form of a conical roller. The alignment member 350 can be configured to rotate about a respective alignment axis 354 which can be substantially perpendicular to the drum axis 120.

Preferably, however, the apparatus 300 comprises a pair of spaced alignment members 350 as shown. Each of the pair of alignment members 350 can be substantially in the form of a conical roller, and each can be configured to rotate about a respective alignment axis 354 wherein each of the alignment axes are substantially parallel to one another. Preferably, each of the alignment axes 354 is substantially perpendicular to the drum axis 120. Also, as discussed above for other embodiments, the alignment members 350 are preferably fabricated from a material, and configured in a manner, which minimizes damage to the tape "T" by contact thereof with the alignment members.

Furthermore, each of the alignment members 350 can be rotatably supported on a support device 360 which can be configured in a manner similar to the support device 260 of the apparatus 200 which is discussed above for FIGS. 5 and 5A. The support device 360 is preferably rigidly connected to a base (not shown) or the like such as a prior art tape read/write device. As is evident from FIG. 6, the support device 360 can comprise a slide joint 362 which can allow the alignment members 350 to move substantially along an alignment path which is indicated by the arrows marked 359.

The alignment path 359 is preferably substantially parallel to each of the alignment axes 354. In addition, the alignment path 359 is preferably substantially perpendicular to the drum axis 120. The support device 360 is configured to move the alignment members 350 substantially along the alignment path 359 in response to change in size of the tape pack 114. That is, as the size of the tape pack 114 increases, the support device 360 can allow the alignment members 350 to move along the alignment path 359 and away from the drum 112.

The movement of the alignment members 350 by the support device 360 can be accomplished by any of a number of possible means including those discussed above for the apparatus 200 for FIGS. 5 and 5A. That is, the alignment members 350 can be held against the tape pack 114 by way of gravitational force and can be moved by way of a following wheel (not shown) similar to that of the apparatus 200. Alternatively, the alignment members 350 can be positioned along the alignment path 359 by way of an actuator (not shown) and an automatic positioning and control system (not shown).

Figure 7:
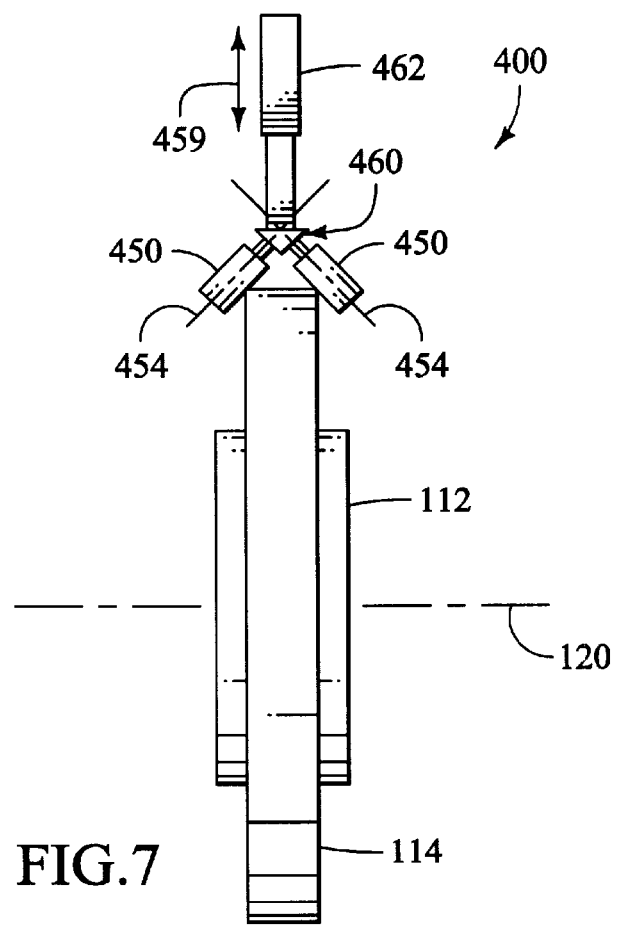
FIG. 7 is a front view of a tape pack forming apparatus in accordance with a fourth embodiment of the present invention.

Moving to FIG. 7, a front view is shown of an apparatus 400 in accordance with a fourth embodiment of the present invention. As is seen, the apparatus 400 also can be configured similarly to the apparatus 200 and 300 which are discussed above for FIGS. 5, 5A, and 6. That is, the apparatus 400 can comprise the drum 112 which is configured to rotate about the drum axis 120. The tape pack 114 can be formed on the drum 112 by rotation thereof about the drum axis 120.

The apparatus 400 comprises an alignment member 450 which can be supported on a support device 460. Preferably, the alignment member 450 is substantially in the form of a cylindrical roller which is configured to rotate about an alignment axis 454. More preferably, the apparatus 400 comprises a pair of alignment members 450 which are each substantially in the form of a cylindrical roller which is supported on the support device 460 so as to rotate about the respective alignment axis 454 as shown.

Each of the alignment axes 454 can be substantially oblique relative to the drum axis 120. That is, each of the alignment axes 454 can be non-parallel and non-perpendicular with respect to the drum axis 120. Furthermore, the alignment axes 454 can be substantially perpendicular to one another. However, it is understood that the alignment axes 454 can have any angular relationship with respect to one another including that of an oblique relationship.

The support device 460 can comprise a slide joint 462 which can be configured to operate in a manner similar to those of the slide joints 262 and 362 of the apparatus 200 and 300, respectively, which are described above and shown in FIGS. 5 and 6, respectively. As is evident from a study of FIG. 7, the support device 460 can be configured to allow the alignment members 450 to move substantially along an alignment path of movement which is indicated by the arrows 459. Preferably, the alignment path 459 is substantially perpendicular to the drum axis 120.

The alignment members 450 can be moved along the alignment path 459 by any of a number of means as described for the apparatus 200 and 300 which are described above. That is, the alignment members 450 can be moved by way of a following wheel (not shown) which is configured to contact the outer periphery of the tape pack 114. Alternatively, the alignment members 450 can be moved by way of an actuator (not shown) in conjunction with an automatic positioning and control system (not show) which can be configured to substantially accurately position the alignment members 450 in response to a changes in size of the tape pack 114 as the tape pack is formed on the drum 112.

Figure 8A:
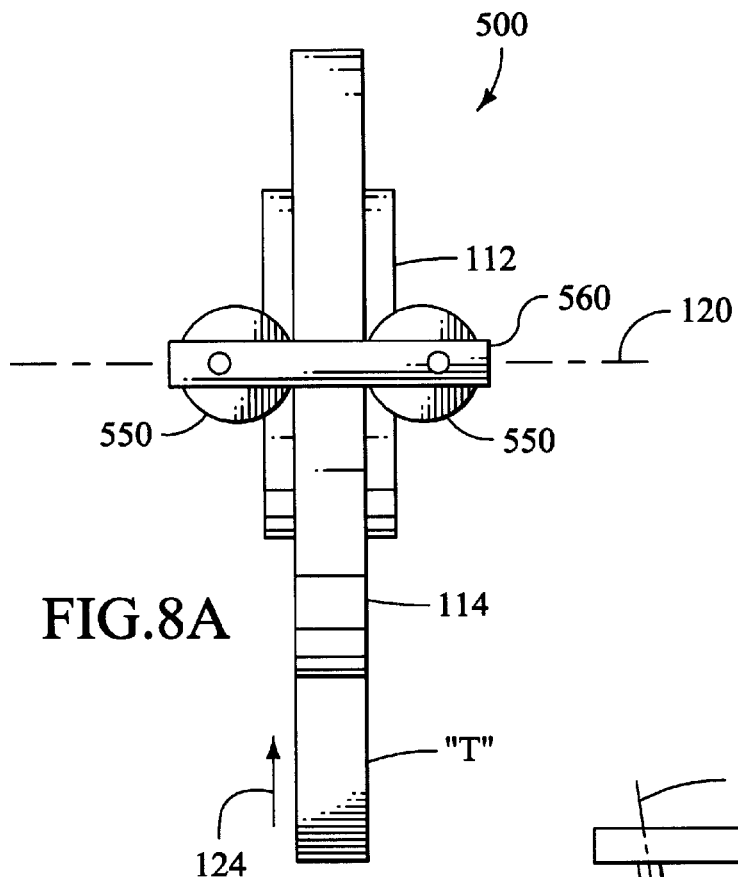
FIG. 8A is a top view of a tape pack forming apparatus in accordance with a fifth embodiment of the present invention.
Figure 8B:
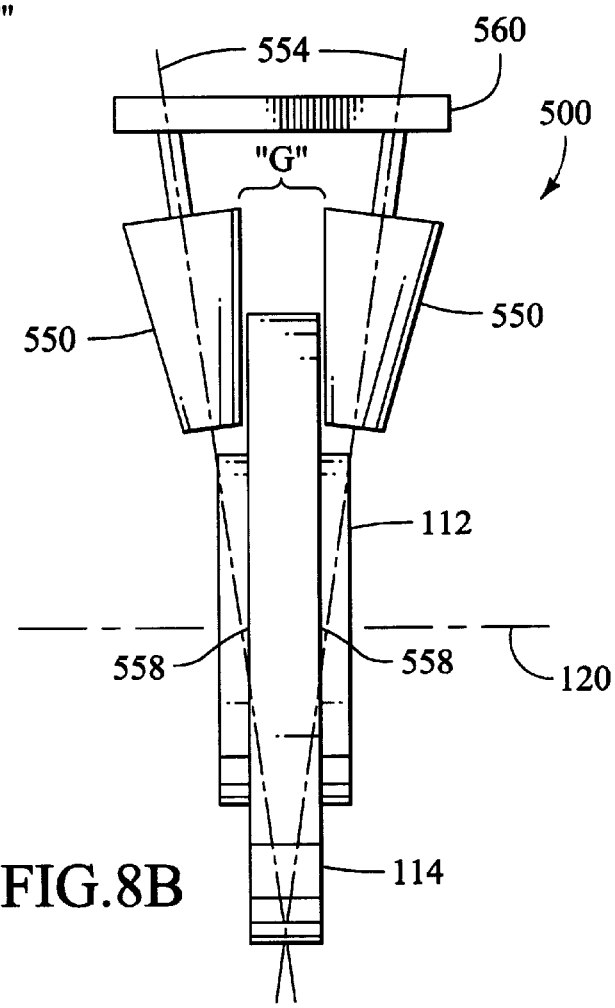
FIG. 8B is a front view of the tape pack forming apparatus which is depicted in FIG. 8A.

Moving now to FIGS. 8A and 8B, a top view and a front view are shown, respectively, of an apparatus 500 in accordance with a fifth embodiment of the present invention. The apparatus 500 can comprise the drum 112 which is configured to rotate about the drum axis of rotation 120. The tape pack 114 can be formed on the drum 112 by rotation thereof about the drum axis 120. The apparatus 500 comprises a dynamic alignment member 550 which can be in the form of a substantially conical roller which is configured to rotate about an alignment axis 554.

The apparatus also comprises a support device 560 on which the alignment member 550 is rotatably mounted in a substantially fixed position relative to the drum axis 120. That is, the alignment member 550 can be supported on the support device 560 so that the movement of the alignment member relative to the drum axis 120 is limited substantially to that of rotation about the alignment axis 554.

Preferably, the apparatus 500 comprises a pair of spaced dynamic alignment members 550 which are each rotatably supported by the support device 560 in a substantially fixed position relative to the drum axis 120. Preferably, the alignment members are arranged in an orientation relative to one another wherein each of the alignment axes 554 are coplanar and wherein a localized, stationary gap "G" is defined between the alignment members. Preferably, the gap "G" is of a substantially constant width and is only slightly greater than the width of the tape "T" of which the tape pack 114 is formed. The gap "G" preferably extends in a substantially perpendicular orientation relative to the drum axis 120.

Also, preferably, each of the alignment axes 554 intersect the drum axis 120 to define respective intersections 558 wherein the distance between the intersections is substantially equal to the width of the gap "G." As the tape pack 114 is formed on the drum 112 by the rotation thereof about the drum axis 120 relative to the alignment members 550, the tape pack periodically passes through the gap "G" defined between the alignment members.

The shape, position, and orientation of the alignment members 550 can facilitate minimal abrasion to the edges of the tape pack 114, while allowing for the support device 560 to be substantially fixed relative to the drum axis 120. That is, the conical shape of the alignment members 550 provides varying speeds of the surface of the alignment members. These varying surface speeds of the alignment members 550 due to the conical shape thereof can be in substantial proportion to the speed of the edge of the tape pack 114 at various distances thereof from the drum axis 120.

For example, at locations on the tape pack 114 which are relatively close to the drum axis 120, the speed of the individual tape windings will be less than the speeds of the tape windings which are located relatively far from the drum axis 120. In cases wherein the support device 560 is not movable relative to the drum axis 120, it is preferable to accommodate for the varying speeds of the tape pack as a function of distance from the drum axis 120.

One such method of accommodating for such variation in speed of the tape pack 114 isto employ substantially conical alignment members 550 as shown. Due to the conical shape of the alignment members 550, the surface speed of the individual alignment members at a first location which is farther from the drum axis 120 is greater than the surface speed of the alignment members at a second location which is closer to the drum axis. Thus, the surface speed of the alignment members 550 can be substantially matched to the speed of the tape pack 114 at various locations thereon. This can result in less damage to the tape "T" due to abrasion from mismatched surface speeds of the alignment members 550, if such were configured as cylindrical rollers, for example.

It is evident that the tape pack 114 can periodically pass through the gap "G" as the drum 112 and the tape pack rotate relative to the alignment members 550. As the size of the tape pack 114 increases, the tape pack 114 conforms to the gap "G" and thus grows in substantially orderly manner and in a direction which is substantially perpendicular to the drum axis 120. As is evident, the use of the apparatus 500 can result in aligned formation of the tape pack 114 on the drum 112. Such use of the apparatus 500 can also substantially eliminate the formation of anomalies in the tape pack 114, such as bumps and the like.

The three embodiments that are described below are somewhat different than the previous embodiments in that the following embodiments employ at least one dynamic alignment member which is configured to rotate along with the drum and tape pack. However, the embodiments described below are similar to the embodiments which are described above in that the alignment members of both are configured to define a localized, stationary gap through which the tape pack periodically passes.

Although the alignment members of the embodiments which are described below substantially rotate along with the drum and tape pack, the gap is substantially localized and stationary with respect to the axis of the drum about which the drum and tape pack rotate as is the case with regard to the embodiments described above. With regard to the embodiments described below, guides are employed to define the movement of the alignment members, and in some cases to deform or deflect the alignment members, as they rotate so as to, in turn, define the gap there between.

Figure 9:
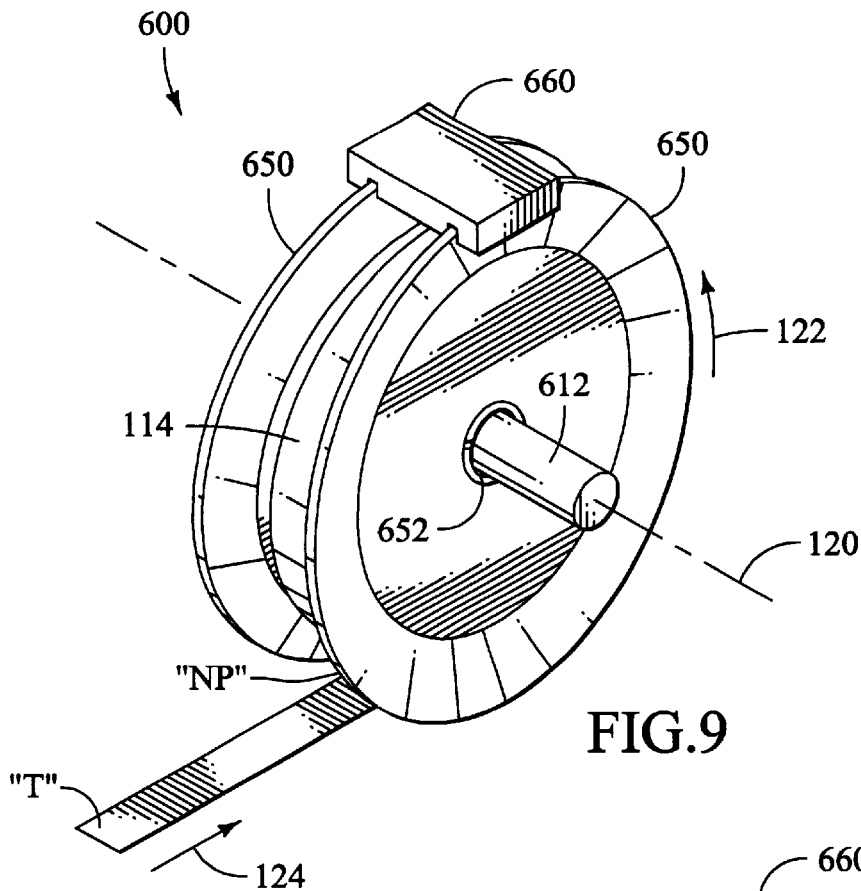
FIG. 9 is a perspective view of a tape pack forming apparatus in accordance with a sixth embodiment of the present invention.

Turning now to FIG. 9, a perspective view is shown of an apparatus 600 in accordance with a sixth embodiment of the present invention. The apparatus 600 comprises a dynamic alignment member 650 which can be substantially in the form of a disk. Preferably, the alignment member 650 can comprise a generally flat central portion and an outer peripheral portion surrounding the central portion, the outer portion defining a surface which is at an angle to the central portion.

Preferably, the apparatus 600 comprises a pair of dynamic alignment members 650 which are each connected to a drum 612 by way of a respective joint 652 such as a universal joint or the like which allows the alignment members to be substantially coupled to a drum 612 while further allowing each of the alignment members to move or swivel relative to the drum.

The drum 612 is configured to rotate about a drum axis of rotation 120. The drum 612 can be configured in a manner similar to that of the drum 112 described above for other embodiments. Each of the alignment members 650 is preferably configured to rotate along with the drum 612, and at substantially the same rotational speed thereof, by way of the respective joints 652. The drum 612 is configured to support the tape pack 114 which can be formed from a length of tape "T" which winds around the drum as the drum rotates about the drum axis 120 in a direction of rotation 122. The apparatus 600 also comprises a guide 660 which is discussed further below.

Figure 9A:
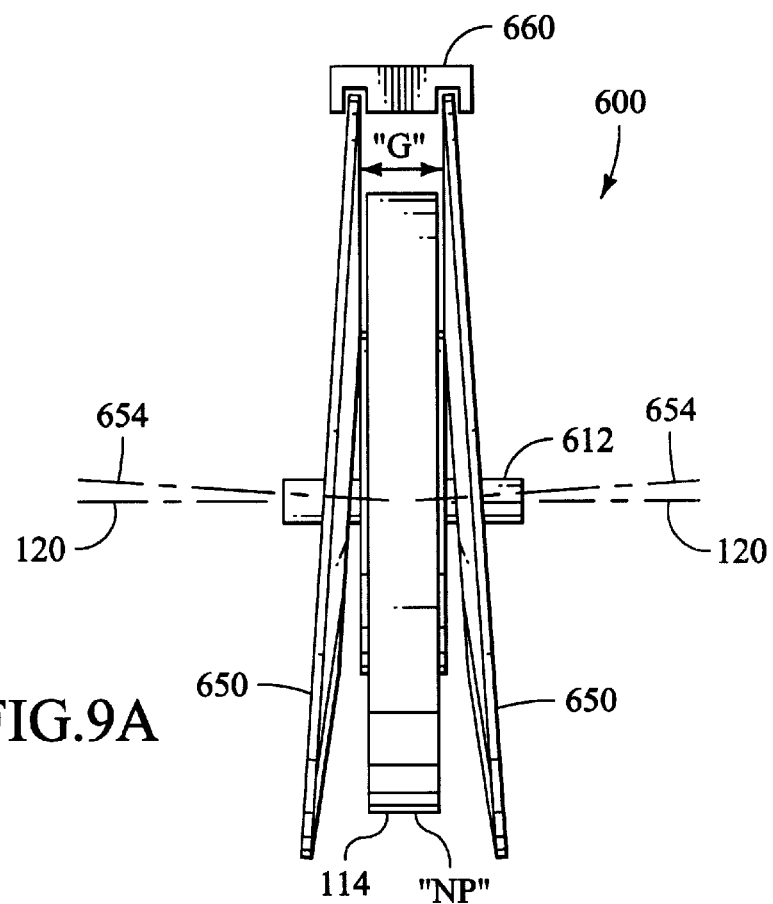
FIG. 9A is a front view of the tape pack forming apparatus which is depicted in FIG. 9.

Moving now to FIG. 9A, a front view is shown of the apparatus 600 which is depicted in FIG. 9. As is seen, each of the alignment members 650 is configured to rotate about a respective alignment axis 654. Each of the alignment axes 654 are preferably slightly inclined relative to the drum axis 120. The slight inclination of each of the alignment axes 654 causes each of the alignment members 650 to be tilted slightly toward the tape pack 114 proximate the guide 660 as shown.

The guide 660 is configured to maintain a given orientation of the alignment axes 654 relative to the drum axis 120. Preferably, the guide 660 is supported on a base (not shown) or the like, such as a prior art tape read/write device. The guide 660 is also preferably supported in a substantially fixed position relative to the drum axis 120. The guide 660 can comprise one or more bearings (not shown) or the like which are configured to movably contact each of the alignment members 650.

Preferably, each of the alignment members 650 is tilted as described above and in a manner which defines a localized, stationary gap "G" there between. The gap preferably has a substantially constant width and extends from the drum axis 120 in a substantially perpendicular orientation thereto. Preferably, the gap "G" has a width which is only slightly greater than the width of the tape "T" from which the tape pack 114 is formed. As is evident, the tape pack 114 can be periodically passed through the gap "G" as the drum 612, tape pack, and alignment members 650 rotate about the respective axes 120, 654.

As is also evident from a study of FIG. 9A, the slight inclination of the alignment axes 654 relative to the drum axis 120 not only causes the alignment members 650 to be tilted slightly toward the tape pack 114 proximate the gap "G," but also causes the alignment members 650 to be tilted slightly away from the tape pack 114 at a location which is substantially opposite the gap "G." Preferably, the nip point "NP" is located at this location which is substantially opposite the gap "G" and where the alignment members 650 are tilted slightly away from the tape pack 114. However, it is understood that the nip point "NP" and the gap "G" can be located in any position relative to one another about the drum axis 120.

The apparatus 600 can be configured so that each of the alignment members 650 can be repositioned axially along the drum axis 120 and relative to the drum 112. That is the apparatus 600 can be configured so that one or both of the alignment members 650 can be moved along the drum axis 120 to cause the gap "G" to become either wider or narrower. Such repositioning of the alignment members 650 can allow the apparatus 600 to accommodate several different widths of tape "T."

Figure 10:
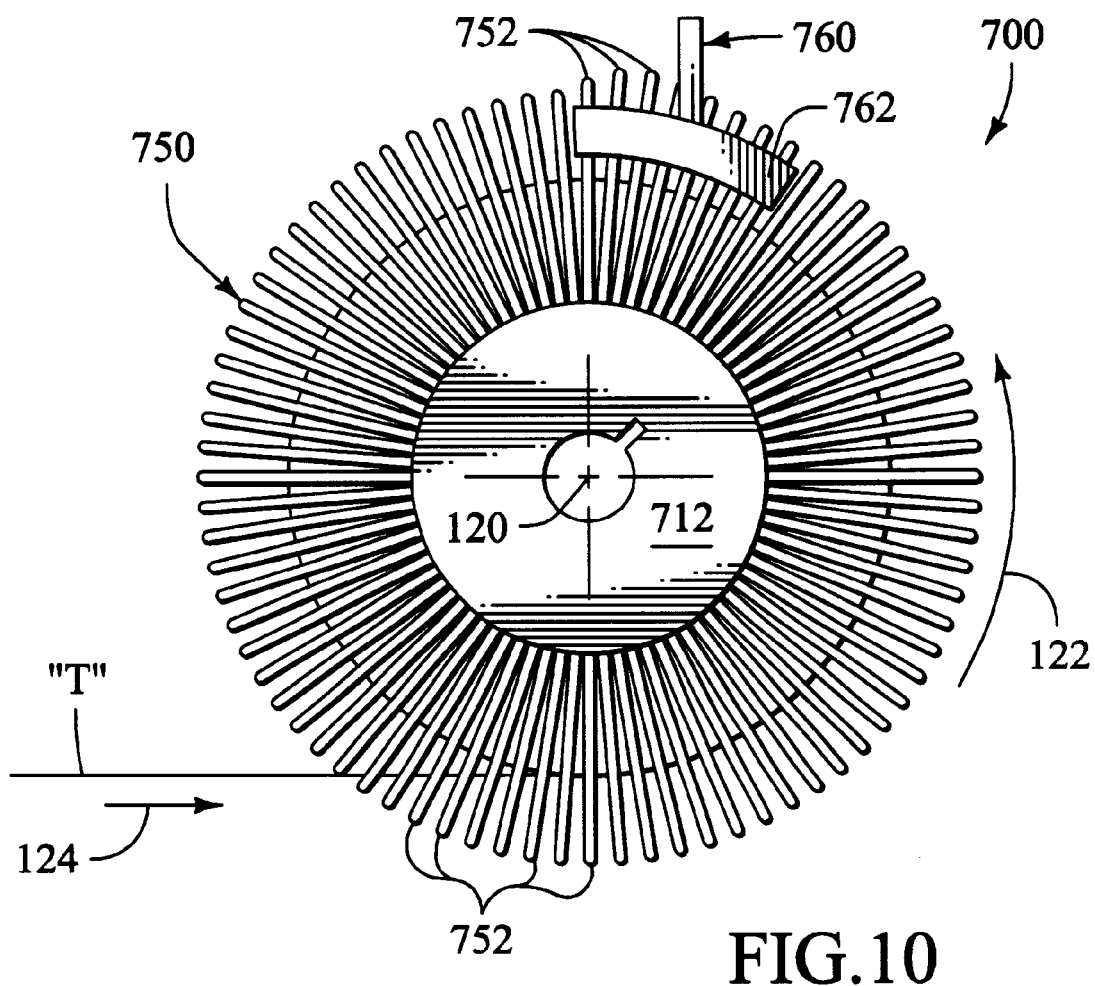
FIG. 10 is a side view of a tape pack forming apparatus in accordance with a seventh embodiment of the present invention.

Moving now to FIG. 10, a side view is shown of an apparatus 700 in accordance with a seventh embodiment of the present invention. The apparatus 700 is somewhat similar to the apparatus 600 described above. However, the apparatus 700 can employ dynamic alignment members which each comprise a plurality of flexible radial elements. The apparatus 700 comprises a drum 712 which is configured to rotate about a drum axis 120. The drum 712 is configured to support thereon a length of tape "T" in a manner similar to those of drums 112, and 612 discussed above.

The drum 712 can form a tape pack (not shown) by rotating in a direction of rotation 122. The length of tape "T" can thus approach the drum 712 in the direction 124 to be wound onto the drum as the drum rotates in the direction 122. Generally, the drum can be configured in a manner similar to that of the drum 112 described above for other embodiments with the exception of those characteristics noted in the following discussion.

The apparatus 700 comprises a dynamic alignment member 750 which can be substantially in the form of a ring which is mounted substantially concentrically about the drum axis 120. The alignment member 750 can comprise a plurality of alignment extensions 752. Each of the alignment extensions 752 can be substantially in the form of a resiliently deflectable spoke or the like which is mounted on, and extends substantially radially from, the drum 712. Each of the alignment extensions 752 can be substantially resiliently flexible. Alternatively, each of the alignment extensions 752 cab be substantially rigid and can be substantially flexibly and resiliently mounted on the drum 712.

The apparatus 700 also comprises a guide 760 which can be mounted on a base (not shown) or the like, such as a prior art tape read/write device. The guide 760 comprises a guide member 762 which is configured to contact the alignment member 750 as the drum 112 and alignment member rotate about the drum axis 120. The guide 760 is also configured to deflect or move at least a portion of the alignment member 750 toward the tape pack (not shown) as the drum 112 and alignment member rotate about the drum axis 120.

That is, as the drum 112 and alignment member 750 rotate about the drum axis 120 relative to the guide 760, the alignment member moves against the guide which deflects or moves at least one alignment extension 752 toward the tape pack (not shown). Preferably, as the drum 112 and the alignment member 750 rotate about the drum axis 120 relative to the guide 760 for a given time interval, the guide deflects or moves a succession of alignment extensions 752 toward the tape pack (not show).

Figure 10A:
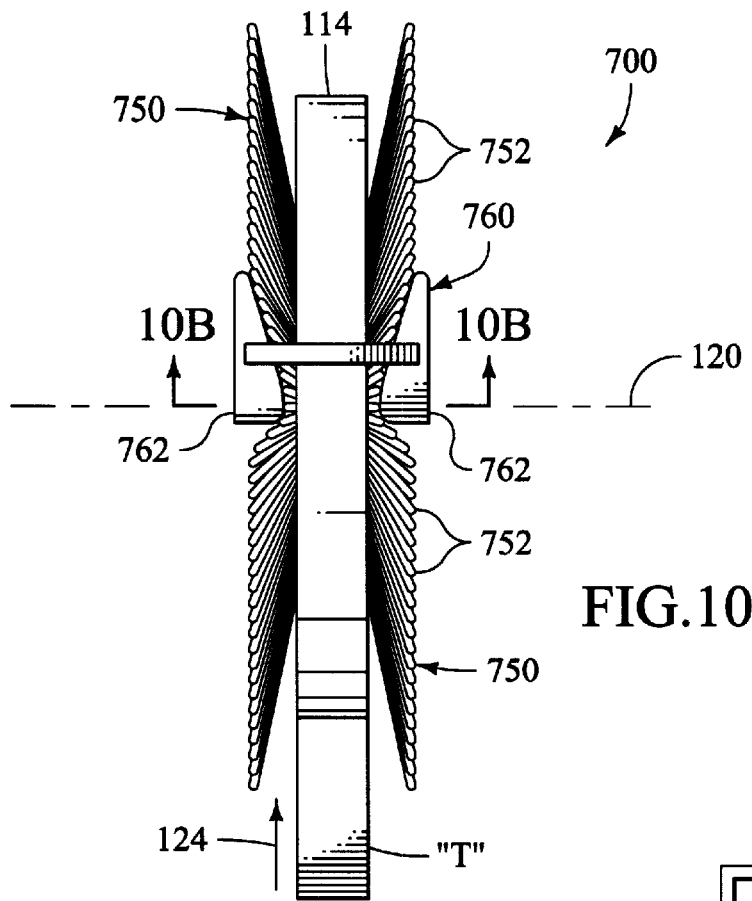
FIG. 10A is a top view of the tape pack forming apparatus which is depicted in FIG. 10.

Moving to FIG. 10A, a top view is shown of the apparatus 700 which is depicted in FIG. 10. As is evident, the tape pack 114 is visible in FIG. 10A although the drum 712 (shown in FIG. 10) is not visible in FIG. 10A because of being obscured by the tape pack. As is also evident, the apparatus 700 preferably comprises a pair of alignment members 750, wherein each of alignment members is positioned on a respective side of the tape pack 114. Also, preferably, each of the pair of alignment members 750 comprises a plurality of alignment extensions 752 which are supported on, and extend substantially radially from, the drum (not shown).

Each of the alignment members 750 is preferably configured to slope away from the outer periphery of the tape pack 114 as shown. That is, each of the individual alignment extensions 752 is preferably resiliently biased to extend slightly away from the tape pack 114. Each of the guide members 762 is configured to contact at least a portion of the respective alignment member 750 as shown. Also, each of the guide members 762 is preferably configured, and oriented relative to each respective alignment member 750, to have a "ramping" or "camming" effect on at least a portion of each respective alignment member.

In other words, each of the guide members 762 is preferably configured so as to have a ramped, or sloped, contour, as well as to have a position and an orientation relative to the respective alignment member 750 so that, as the respective alignment member 750 rotates about the drum axis 120, at least one alignment extension 752 of each alignment guide 750 is deflected, or moved, toward the tape pack 114. As a given alignment extension 752 passes by the guide 760, the given alignment extension can resiliently deflect away from the tape pack 114 and back to its original biased position.

A sectional view 10B—10B is taken through the apparatus 700 to further illustrate a preferred configuration of the apparatus. Moving to FIG. 10B, the sectional view 10B—10B is shown of the apparatus depicted in FIGS. 10 and 10A. As is seen, the drum 712 is configured to rotate about the drum axis 120. Preferably, a pair of alignment members 750 are supported on the drum 712 and on either side of the tape pack 114 which is formed on the drum.

Each of the alignment members 750 preferably comprises a plurality of alignment extensions 752 which are resiliently mounted on the drum 712 and which extend substantially radially from the drum. Although each of the alignment extensions 752 extend substantially radially from the drum 712, each alignment extension is biased to slope slightly away from the tape pack 114 as shown.

Figure 10B:
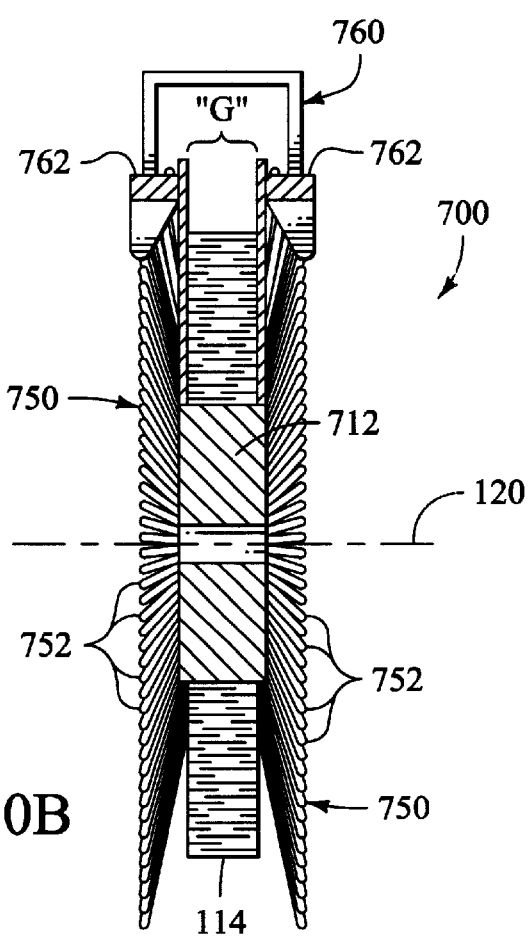
FIG. 10B is a sectional view 10B—10B which is taken through the tape pack forming apparatus which is depicted in FIG. 10A.

As further study of FIG. 10B reveals, each of the alignment extensions 752 can be deflected from its respective biased position and toward the tape pack 114 by movement of each respective alignment extension against each respective guide member 762 due to the movement of the drum 712 and respective alignment members 750 about the drum axis 120. As a given pair of alignment extensions 752 are substantially fully deflected by movement thereof against the respective guide members 762, a localized, stationary gap "G" is formed between the given pair of alignment extensions as shown.

Preferably, the gap "G" is of a substantially constant width which is only slightly wider than the width of the tape "T." Also, the gap "G" preferably extends from the drum 712 in a substantially perpendicular orientation relative to the drum axis 120. As is seen, the tape pack 114 can periodically pass through the gap "G" as the drum 712 and tape pack rotate about the drum axis 120. Such passage of the tape pack 114 through the gap "G" can facilitate aligned formation of the tape pack on the drum 712.

Figure 11:
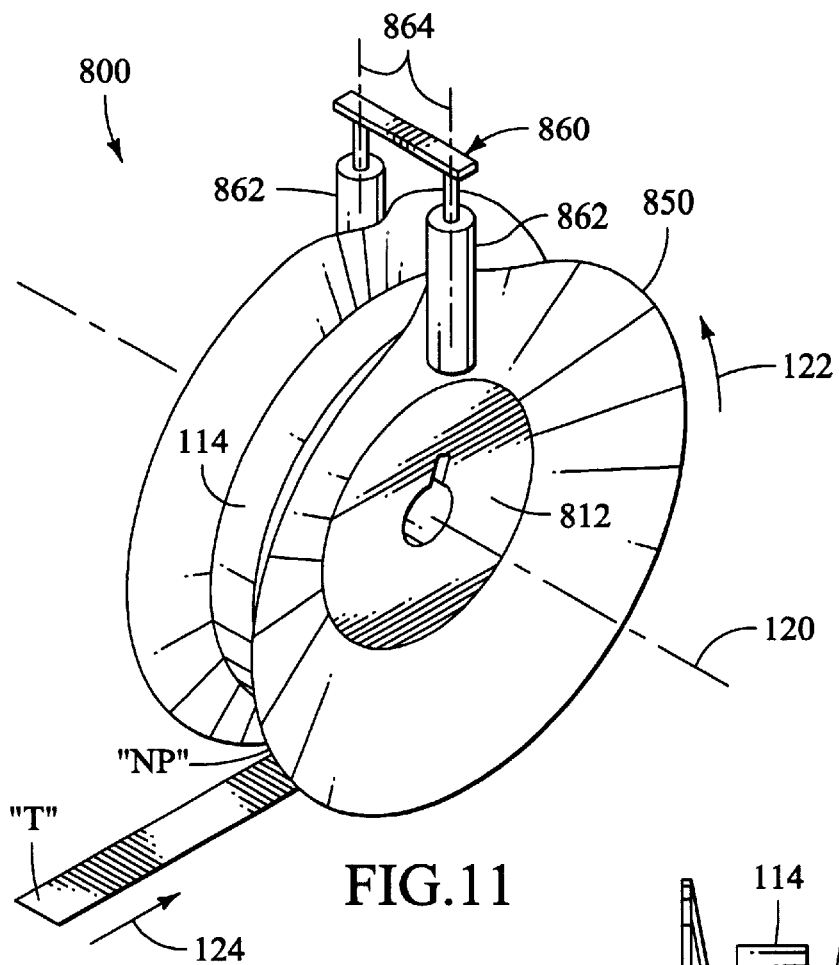
FIG. 11 is a tape pack forming apparatus in accordance with an eighth embodiment of the present invention.

Now turning to FIG. 11, a perspective view is shown of an apparatus 800 in accordance with an eighth embodiment of the present invention. The apparatus 800 comprises a drum 812 which is configured to rotate about a drum axis of rotation 120. The drum 812 is configured to support a tape pack 114 which can be formed on the drum by rotation thereof about the drum axis 120. As is seen, as the drum 812 rotates about the drum axis 120 in the direction of rotation 122, the length of tape "T" approaches the drum in the direction 124 to join the tape pack 114 at the nip point "NP." Generally, the drum 812 can be configured in a manner similar to that of the drum 112 discussed above for other embodiments.

The apparatus 800 also comprises a dynamic alignment member 850 which is preferably in the form of a substantially deformable conical ring or the like. The alignment member 850 is also preferably supported on the drum 812 so as to rotate therewith about the drum axis 120. More preferably, the apparatus 800 comprises a pair of spaced dynamic alignment members 850 which are each supported on the drum 812 and on either side of the tape pack 114 as shown. The alignment members 850 can be fabricated from a resilient, deformable material such as rubber or soft plastic. Alternatively, the alignment members 850 can also be fabricated from a material such as thin spring steel.

The apparatus 800 also comprises a guide 860 which can be supported on a base (not shown) or the like, such as a prior art tape read/write device. Preferably, the guide 860 is supported on a base (not shown) or the like in a substantially fixed position relative to the drum axis 120. The guide 860 preferably comprises a guide member 862. The guide member 862 is configured to contact the respective alignment member 850 so as to resiliently deflect the alignment member toward the tape pack 114.

The guide member 862 is preferably configured as a cylindrical roller or the like which is rotatably mounted on the guide device 860 and further configured to rotate about a respective guide axis 864. The guide member 862 can be a substantially cylindrical roller as depicted or, in the alternative, can be a substantially conical roller as in the manner of the guide members 550 discussed above for FIGS. 8A and 8B.

More preferably, the guide 860 comprises a pair of spaced guide members 862 which are each configured to resiliently deflect a respective alignment member 850 toward the tape pack 114. Preferably, each of the pair of guide members is a roller which is rotatably supported on the guide 860. Each of the pair of guide members is also preferably configured to rotate about a respective guide axis 864

Figure 11A:
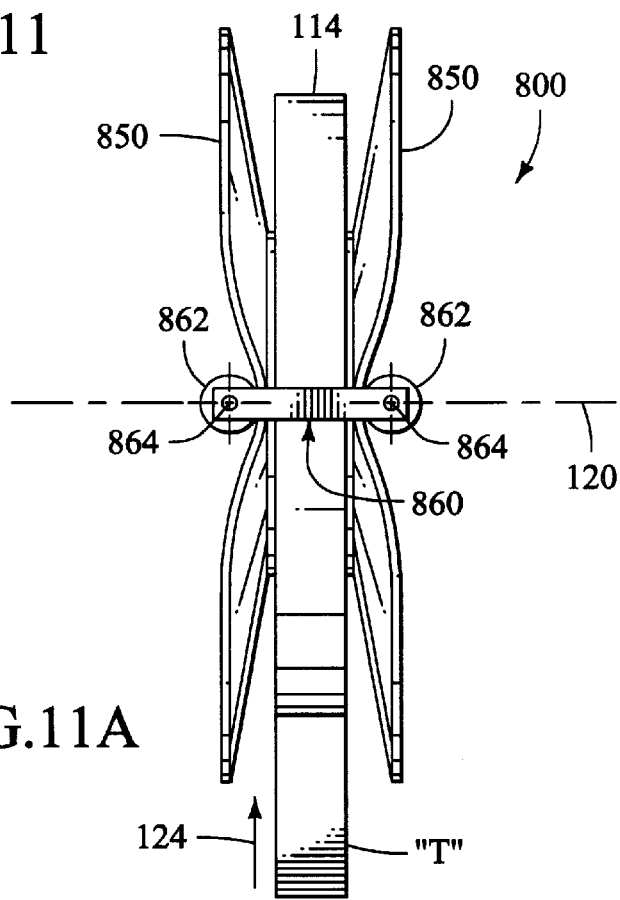
FIG. 11A is a top view of the tape pack forming apparatus which is depicted in FIG. 11.

Moving to FIG. 11A, a top view is shown of the apparatus 800 which is depicted in FIG. 11. The apparatus 800 preferably comprises a pair of alignment members 850 which are each supported on the drum (not shown). Each of the pair of alignment members 850 is positioned on a respective side of the tape pack 114 as shown.

As is seen, each of the alignment members 850 passes between the tape pack 114 and a respective guide member 862 wherein each alignment member is resiliently deflected toward the tape pack 114 by movement of each alignment member against the respective guide member. That is, the pair of guide members 862 can act as "pinch rollers" to pinch, or resiliently deflect, each respective alignment member 850 toward the tape pack 114 as the alignment members and tape pack rotate along with the drum (not shown) about the drum axis 120.

Figure 11B:
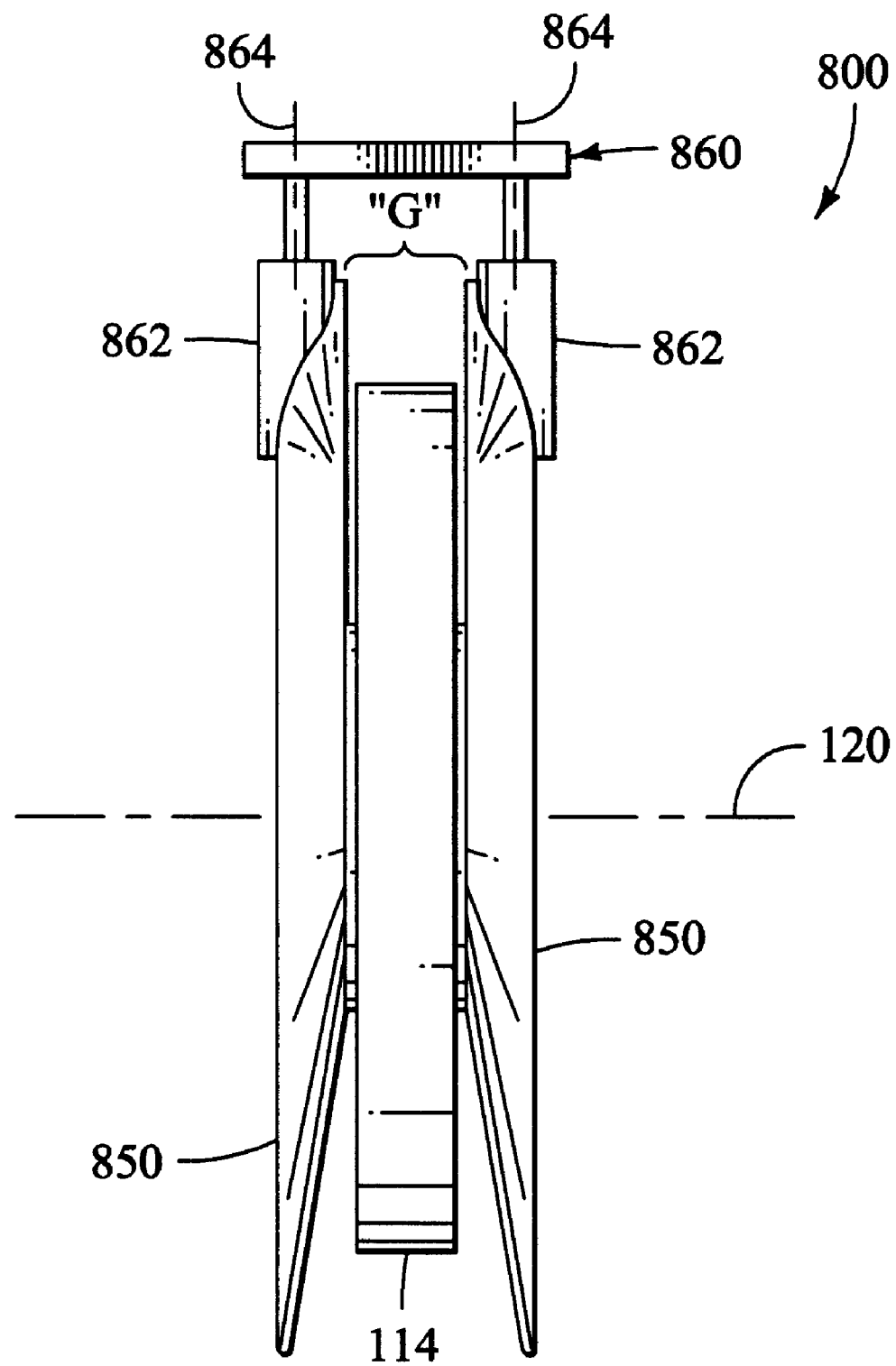
FIG. 11B is a front view of the tape pack forming apparatus which is depicted in FIG. 11.

Moving now to FIG. 11B, a front view is shown of the apparatus 800 which is depicted in FIGS. 11 and 11A. As discussed above, each of the pair of guide members 862 can act to resiliently deflect, or pinch, the respective alignment members 850 to toward the tape pack 114 to form a localized, stationary gap "G" between the alignment members.

Preferably, the gap "G" has a substantially constant width which is only slightly greater than the width of the tape "T." Also, preferably, the gap "G" extends from the drum axis 120 in a substantially perpendicular orientation thereto. As is evident, the tape pack 114 can periodically pass through the gap "G" as the tape pack rotates about the drum axis 120.

As is further seen from a study of FIG. 11B, each of the alignment members 850 preferably slope slightly away from the tape pack 114 except near the location of the gap "G" wherein each of the alignment members extend substantially perpendicular from the drum axis 120. The gap "G" is defined between each of the pair of alignment members 850 by the action there against of the guide members 862 as the tape pack 114 forms by rotation thereof about the drum axis 120. Passage of the tape pack 114 through the gap "G" serves to facilitate aligned formation of the tape pack.

As discussed above with reference to apparatus 700 and 800 which are depicted in FIGS. 10 through 10B and FIGS. 11 through 11B, respectively, the deflection of the alignment members 750 and 850, respectively, can be caused by the movement thereof against a substantially stationary guide 760 and 860, respectively. It is understood, however, that other means of resiliently deflecting the alignment members 750 and 850, respectively, can be employed.

For example, in accordance with other alternative embodiments of the present invention which are not shown, but which are similar to the apparatus 700 and 800, respectively, a stream of high-pressure fluid can be directed against the alignment members 750 and 850, respectively, to resiliently deflect the alignment members toward the tape pack 114 so as to define the gap "G." Such high-pressure fluid can be directed against the alignment members 750 and 850 from, for example, a fluid nozzle which is mounted in a substantially stationary orientation relative to the drum axis 120. Such a high-pressure fluid can comprise pressurized air, for example.

In accordance with a ninth embodiment of the present invention, a method of forming a tape pack is disclosed. In accordance with the method, a tape pack is formed by rotating the tape pack about an axis of rotation. At least several outermost windings of the tape pack are urged into aligned formation at a localized, stationary contact point which the tape pack periodically passes.

The aligned formation of the tape pack can be caused by periodic contact of the outermost windings thereof with one or more alignment members. Alternatively, the stationary contact point can comprise a gap defined by at least one dynamic alignment member through which gap the tape pack is periodically passed. The gap can be defined by one or more dynamic alignment members.

The method can include rotating a pair of resiliently deformable dynamic alignment members substantially along with the tape pack and resiliently deflecting the alignment members to define a gap there between. The tape pack can be rotated so as to pass through the gap to facilitate substantial aligned formation thereof. Deflection of the alignment members can be caused by movement thereof against a respective guide member. Alternatively, the deflection of the alignment members can be accomplished by directing a stream of fluid against the respective alignment members as the alignment members rotate.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An apparatus for forming a tape pack, comprising:
 a pair of alignment members between which the tape pack can be passed to facilitate substantially aligned formation thereof, wherein a localized, substantially stationary gap is defined between the alignment members, and wherein the tape pack can be periodically passed through the gap to facilitate substantially aligned formation thereof;
 a drum which is configured to rotate about a drum axis of rotation and which is located substantially between the alignment members, and about which drum the tape pack can be formed; and,
 a pair of substantially flexible joints, wherein each one of the joints connects the drum to one each of the alignment members, and wherein the alignment members being thereby connected to the drum are configured to rotate with the drum at substantially the same rotational speed thereof, and wherein each alignment member is configured to rotate about a respective alignment axis which is inclined relative to the drum axis of rotation.

2. The apparatus of claim 1 and wherein each of the alignment members is substantially in the form of a disc.

3. The apparatus of claim 2, and further comprising a guide which is configured to contact each of the alignment members during rotation thereof to maintain the alignment axes in a substantially fixed orientation relative to the drum axis.

4. An apparatus for forming a tape pack, comprising:

a pair of alignment members between which the tape pack can be passed to facilitate substantially aligned formation thereof, wherein a localized, substantially stationary gap is defined between the alignment members, and wherein the tape pack can be periodically passed through the gap to facilitate substantially aligned formation thereof; and, a drum which is configured to rotate about a drum axis of rotation and about which drum the tape pack can be formed, and wherein each alignment member comprises a plurality of alignment extensions which are supported on the drum and which extend substantially radially therefrom, and which are rotatable therewith about the drum axis, and which can be resiliently deflected relative to the drum and substantially toward the tape pack.

5. The apparatus of claim 4, and further comprising a guide which configured to deflect the alignment extensions toward the tape pack by movement of the respective alignment extensions against the guide as the drum rotates, whereby the alignment extensions are deflected toward the tape pack to form the gap.

6. An apparatus for forming a tape pack, comprising:

a pair of alignment members between which the tape pack can be passed to facilitate substantially aligned formation thereof, wherein a localized, substantially stationary gap is defined between the alignment members, and wherein the tape pack can be periodically passed through the gap to facilitate substantially aligned formation thereof; and, a drum which is configured to rotate about a drum axis of rotation and about which drum the tape pack can be formed, and wherein each alignment member comprises a ring which can be resiliently deflected toward the tape pack and which is supported on the drum and which is rotatable with the drum about the drum axis, and wherein each ring is substantially conical when not deflected, whereby each ring radially slopes away from the tape pack.

7. The apparatus of claim 6, and further comprising a stationary guide which is configured to contact each of the alignment members by movement thereof against the guide, whereby the alignment members are deflected toward the tape pack to form the gap.

* * * * *

UNITED STATES PATENT AND TRADEMARK OFFICE
CERTIFICATE OF CORRECTION

PATENT NO. : 6,450,438 B1
DATED : September 17, 2002
INVENTOR(S) : Jeffrey S. McAllister et al.

It is certified that error appears in the above-identified patent and that said Letters Patent is hereby corrected as shown below:

Column 17,
Line 31, delete "(not show)" and insert therefor -- (not shown) --

Column 19,
Line 13, delete "864" and insert therefor -- 864. --

Column 21,
Line 20, before "configured" insert -- is --

Signed and Sealed this

Fourth Day of January, 2005

JON W. DUDAS
*Director of the United States Patent and Trademark Office*